(12) United States Patent
Muraoka et al.

(10) Patent No.: US 11,273,870 B2
(45) Date of Patent: Mar. 15, 2022

(54) VEHICLE-BODY STRUCTURE OF VEHICLE

(71) Applicant: MAZDA MOTOR CORPORATION, Hiroshima (JP)

(72) Inventors: Shuji Muraoka, Hiroshima (JP); Makoto Morimoto, Hiroshima (JP); Haruki Kiguchi, Hiroshima (JP); Satoshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/055,503

(22) PCT Filed: May 22, 2019

(86) PCT No.: PCT/JP2019/020256
§ 371 (c)(1),
(2) Date: Nov. 13, 2020

(87) PCT Pub. No.: WO2019/225642
PCT Pub. Date: Nov. 28, 2019

(65) Prior Publication Data
US 2021/0086836 A1 Mar. 25, 2021

(30) Foreign Application Priority Data
May 23, 2018 (JP) .............................. JP2018-098722

(51) Int. Cl.
*B62D 25/02* (2006.01)
*B62D 21/15* (2006.01)
(Continued)

(52) U.S. Cl.
CPC ......... *B62D 25/025* (2013.01); *B62D 21/157* (2013.01); *B62D 25/04* (2013.01); *B62D 27/023* (2013.01)

(58) Field of Classification Search
CPC ............................ B62D 25/025; B62D 27/023
(Continued)

(56) References Cited

U.S. PATENT DOCUMENTS 6,866,115 B2 * 3/2005 Miyasaka ............ B62D 21/155
180/311
9,694,853 B2 * 7/2017 Craig ..................... B62D 21/15
(Continued)

FOREIGN PATENT DOCUMENTS

JP 2010269613 A 12/2010

OTHER PUBLICATIONS

International Search Report issued in PCT/JP2019/020256; dated Jun. 25, 2019.
(Continued)

*Primary Examiner* — Dennis H Pedder
(74) *Attorney, Agent, or Firm* — Studebaker & Brackett PC

(57) ABSTRACT

To provide a vehicle-body structure of a vehicle which can achieve both absorption of a front-end collision load acting on a side sill via a front wheel and prevention of receding of the front wheel toward the vehicle-width-direction inner side. The vehicle-body structure of the vehicle 1 includes front wheels 2 and side sills 5 in which a side sill outer 52 and a side sill inner 51 form a closed cross-section; the side sill inner 51 includes an inner body 53 in an open cross-sectional shape open on the vehicle-width-direction outer side, and an inner front end 54 connected to a front end of the inner body 53; the side sill outer 52 includes an outer body 55 in an open cross-sectional shape open on the vehicle-width-direction inner side, and an outer front end 56 connected to a front end of the outer body 55; and the inner body 53, the outer body 55, the inner front end 54, and the outer front end 56 are configured in such a manner that
(Continued)

deformation strength against a pressure load from the vehicle front side decreases stepwise in this order.

9 Claims, 15 Drawing Sheets

(51) Int. Cl.
  *B62D 25/04*      (2006.01)
  *B62D 27/02*      (2006.01)
(58) Field of Classification Search
  USPC .................................. 296/209, 187.1, 187.09
  See application file for complete search history.

(56) References Cited

U.S. PATENT DOCUMENTS

| | | | |
|---|---|---|---|
| 2010/0295336 A1 | 11/2010 | Itakura | |
| 2016/0194031 A1* | 7/2016 | Yamamoto | B62D 25/025 296/187.1 |
| 2017/0050679 A1* | 2/2017 | Shirooka | B62D 25/025 |

OTHER PUBLICATIONS

International Preliminary Report on Patentability and Written Opinion issued in PCT/JP2019/020256; dated Nov. 24, 2020.

* cited by examiner

1··· VEHICLE
15··· STRIKER
552··· OUTER TOP FACE
5··· SIDE SILL
52··· SIDE SILL OUTER
S··· DOORWAY
13··· REAR DOOR
55··· OUTER BODY

5⋯ SIDE SILL
53⋯ INNER BODY
58⋯ UPPER-SIDE OUTER REINFORCEMENT MEMBER
552a⋯ INCLINED PORTION

51⋯ SIDE SILL INNER
55⋯ OUTER BODY
532⋯ INNER TOP FACE

52⋯ SIDE SILL OUTER
57⋯ INNER REINFORCEMENT MEMBER
552⋯ OUTER TOP FACE

| 5⋯ SIDE SILL | 13⋯ REAR DOOR | 15⋯ STRIKER |
| 51⋯ SIDE SILL INNER | 52⋯ SIDE SILL OUTER | 53⋯ INNER BODY |
| 55⋯ OUTER BODY | 532⋯ INNER TOP FACE | 552⋯ OUTER TOP FACE |

5··· SIDE SILL
51··· SIDE SILL INNER
53··· INNER BODY
55··· OUTER BODY
532··· INNER TOP FACE
552··· OUTER TOP FACE

52··· SIDE SILL OUTER
54··· INNER FRONT END
56··· OUTER FRONT END
542··· FRONT-END TOP FACE PORTION
552a··· INCLINED PORTION

VEHICLE-BODY STRUCTURE OF VEHICLE

TECHNICAL FIELD

The present invention relates to a vehicle-body structure of a vehicle which, when a vehicle front portion collides with a collided object as in, for example, a small overlap collision, absorbs a front-end collision load via a front wheel by deformation of a side sill.

BACKGROUND ART

In a vehicle such as an automobile, it has been known that when a vehicle front portion collides with a collided object as in, for example, a small overlap collision, a front wheel recedes and thereby a front-end collision load acts on a vehicle body via the front wheel.

For example, Patent Literature 1 discloses a vehicle-body structure which, at the time of front-end collision, absorbs a front-end collision load acting on a vehicle body via a front wheel by deformation of a side sill.

Specifically, Patent Literature 1 discloses a vehicle-body structure in which a side sill outer forming a side sill is formed by a first component, a second component, and a third component in this order from the vehicle front side and in which the first component, the second component, and the third component are set so that deformation strength against a pressure load from the vehicle front side increases in this order.

Thereby, in Patent Literature 1, the side sill outer in contact with the front wheel is deformed in the order of the first component, the second component, and the third component at the time of front-end collision, so that the front-end collision load acting on the vehicle body via the front wheel is absorbed stepwise by a simple configuration, suppressing deformation of a vehicle cabin.

Meanwhile, the front wheel in contact with the side sill moves further toward the vehicle rear side in association with the progress of the front-end collision. At this time, for example, if the front wheel in contact with a front end of the side sill deflects toward the vehicle-width-direction inner side in association with the progress of the front-end collision, the front wheel recedes toward a dash panel and the like. Thus, the front-end collision load via the front wheel may act on the vehicle cabin of the vehicle, causing deformation of the vehicle cabin of the vehicle.

CITATION LIST

Patent Literature

Patent Literature 1: Japanese Patent Laid-Open No. 2010-269613

SUMMARY OF INVENTION

Technical Problem

In view of the above-described problem, the present invention has an object to provide a vehicle-body structure of a vehicle which can achieve both absorption of a front-end collision load acting on a side sill via a front wheel and prevention of receding of the front wheel toward the vehicle-width-direction inner side.

Solution to Problem

To achieve the object, the present invention is a vehicle-body structure of a vehicle, characterized by including a pair of left and right side sills including a side sill outer and a side sill inner, the side sill outer and the side sill inner being joined along a vehicle width direction and forming a closed cross-section extending in a vehicle front-rear direction, wherein the side sill inner includes an inner body formed so as to have an open cross-section open on a vehicle-width-direction outer side, in which the open cross-section extends in the vehicle front-rear direction, and an inner front end connected to a front end of the inner body and facing to each of a pair of left and right front wheels so as to serve as a front end portion of the side sill; the side sill outer includes an outer body formed so as to have an open cross-section open on a vehicle-width-direction inner side, the open cross-section extending in the vehicle front-rear direction, and an outer front end connected to a front end of the outer body and facing to each of the pair of left and right front wheels so as to serve as a front end portion of the side sill; and the inner body of the side sill inner, the outer body of the side sill outer, the inner front end of the side sill inner, and the outer front end of the side sill outer are configured in such a manner that deformation strength against a pressure load from a vehicle front side decreases stepwise in this order.

According to the present invention configured in this way, both absorption of a front-end collision load acting on the side sill via the front wheel and prevention of receding of the front wheel toward the vehicle-width-direction inner side can be achieved.

Specifically, the deformation strength against the pressure load from the vehicle front side is lower in the inner front end and the outer front end than in the inner body and the outer body, and thus, according to the vehicle-body structure of the vehicle according to the present invention, when the pressure load from the vehicle front side acts on the front end of the side sill, the outer front end and the inner front end can start deformation substantially simultaneously.

Thus, compared with a case where the inner front end is not deformed, in the vehicle-body structure of the vehicle according to the present invention, the front-end collision load via the front wheel can stably act on the outer front end, and the front-end collision load acting on the side sill via the front wheel can be stably absorbed by the deformation of the inner front end and the deformation of the outer front end.

Furthermore, the deformation strength against the pressure load from the vehicle front side is lower in the outer front end than in the inner front end, and thus the outer front end can be more actively deformed than the inner front end. Thus, in the vehicle-body structure of the vehicle according to the present invention, the deformation amount at the front end of the side sill outer can be made larger than that at the front end of the side sill inner.

Thereby, when the front wheel in contact with the front end of the side sill further recedes in association with the progress of the front-end collision, the front wheel can deflect toward the vehicle-width-direction outer side. Accordingly, the vehicle-body structure of the vehicle according to the present invention can achieve both absorption of the front-end collision load acting on the side sill via the front wheel and prevention of the receding of the front wheel toward the vehicle-width-direction inner side.

Furthermore, in the present invention, preferably, the inner front end of the side sill inner includes a top face and a bottom face, the top face and the bottom face facing to each other in a vehicle up-down direction, and the top face of the inner front end of the side sill inner is formed in a shape having a length in the vehicle front-rear direction, in which the length is shorter than a length of the bottom face of the inner front end in the vehicle front-rear direction.

According to the vehicle-body structure of the vehicle of the present invention configured in this way, when the front wheel recedes in association with the front-end collision, while the front wheel can early abut against the inner body whose deformation strength against the pressure load from the vehicle front side is higher than that of the inner front end, the front-end collision load acting on the inner front end can be absorbed by deformation of the bottom face of the inner front end.

Thus, the vehicle-body structure of the vehicle according to the present invention, without deteriorating the function of absorbing the front-end collision load at the inner front end, can secure a larger difference between the deformation amount of the inner front end and the deformation amount of the outer front end.

Furthermore, the bottom face of the inner front end is more greatly deformed than the top face of the inner front end, and thus the front wheel which recedes in association with the progress of the front-end collision can be easily guided toward the vehicle lower side. Accordingly, in the vehicle-body structure of the vehicle according to the present invention, the receding of the front wheel toward the vehicle upper side and the vehicle-width-direction inner side can be prevented by the inner front end having the top face whose length in the vehicle front-rear direction is shorter than that of the bottom face.

Furthermore, in the present invention, preferably, further provided is a pair of left and right hinge pillars extending in a vehicle up-down direction, each hinge pillar having a lower end connected to a vicinity of a front end of the side sill, wherein the outer body of the side sill outer and the inner body of the side sill inner are fastened and fixed to the lower ends of the hinge pillars at a plurality of areas.

According to the vehicle-body structure of the vehicle of the present invention configured in this way, for example, compared with a case where the hinge pillar and the side sill are welded, connecting strength between the hinge pillar and the side sill can be enhanced. Thus, the vicinity of the front end of the outer body and the vicinity of the front end of the inner body can be made higher in rigidity than the outer front end and the inner front end.

Thereby, when the front wheel which has receded in association with the front-end collision contacts the front end of the side sill, deformation of the outer body and the inner body due to the front-end collision load acting on the front end of the side sill via the front wheel can be suppressed. Thus, in the vehicle-body structure of the vehicle according to the present invention, the front wheel which further recedes in association with the progress of the front-end collision can reliably deflect toward the vehicle-width-direction outer side.

Furthermore, the front-end collision load acting on the front end of the side sill can be transferred to the farther side of the vehicle body via the outer body, the inner body, and the hinge pillar. Accordingly, in the vehicle-body structure of the vehicle according to the present invention, fastening and fixing the side sill to the hinge pillar can reliably prevent the receding of the front wheel toward the vehicle-width-direction inner side.

Furthermore, in the present invention, preferably, in a plan view, a top face of the outer body of the side sill outer is formed in a shape having a front end edge inclined from a vicinity of a boundary between a top face of the inner body of the side sill inner and the top face of the inner front end of the side sill inner toward a vehicle rear side and the vehicle-width-direction outer side.

According to the vehicle-body structure of the vehicle of the present invention configured in this way, the front end edge of the top face of the outer body can function as a guide portion which guides the front wheel toward the vehicle rear side and the vehicle-width-direction outer side.

Thus, the front wheel which recedes in association with the progress of the front-end collision can more reliably deflect toward the vehicle-width-direction outer side. Accordingly, in the vehicle-body structure of the vehicle according to the present invention, the top face of the outer body which has a front end inclined toward the vehicle rear side and the vehicle-width-direction outer side can more reliably prevent the receding of the front wheel toward the vehicle-width-direction inner side.

Furthermore, in the present invention, preferably, a top face in a vicinity of the front end of the outer body of the side sill outer includes an inclined portion inclined in such a manner that, in a front view, an end of the inclined portion on the vehicle-width-direction inner side is located on a vehicle upper side with respect to an end of the inclined portion on the vehicle-width-direction outer side.

According to the vehicle-body structure of the vehicle of the present invention configured in this way, a length of the top face in the vehicle up-down direction and a cross-sectional area thereof in the vicinity of the front end of the outer body can be more greatly secured. Thus, the deformation strength of the outer body against the pressure load from the vehicle front side can be enhanced.

Thereby, in the vehicle-body structure of the vehicle, the front wheel which recedes in association with the progress of the front-end collision can further reliably deflect toward the vehicle-width-direction outer side along the front end edge of the top face of the outer body. Accordingly, in the vehicle-body structure of the vehicle according to the present invention, the inclined portion provided at the outer body can further reliably prevent the receding of the front wheel toward the vehicle-width-direction inner side.

Furthermore, in the present invention, preferably, in a front view, the inclined portion of the outer body of the side sill outer is formed in a shape inclined from a position on the vehicle-width-direction inner side relative to the end on the vehicle-width-direction outer side.

According to the vehicle-body structure of the vehicle of the present invention configured in this way, without deteriorating formability of the outer body, the deformation strength of the outer body against the pressure load from the vehicle front side can be secured, and thus the receding of the front wheel toward the vehicle-width-direction inner side can be prevented.

Specifically, for example, in a case where the inclined portion of the outer body is formed in a shape inclined from the end on the vehicle-width-direction outer side of the top face, an end on the vehicle rear side and the vehicle-width-direction outer side of the inclined portion is located above a corner on the vehicle upper side and the vehicle-width-direction outer side of the outer body. Thus, the end on the vehicle rear side and the vehicle-width-direction outer side of the inclined portion may become a bent point which bends due to the pressure load from the vehicle front side.

In contrast, the inclined portion is formed in the shape inclined from the position on the vehicle-width-direction inner side relative to the end on the vehicle-width-direction outer side, and thus, in the vehicle-body structure of the vehicle according to the present invention, the bent point is less likely to be formed, so that the deformation strength of the outer body against the pressure load from the vehicle front side can be stably secured.

Furthermore, in the top face of the outer body, an increase in shape change from a portion on the vehicle rear side relative to the inclined portion to the inclined portion can be suppressed, and thus reduction of the formability of the outer body can be prevented.

Accordingly, in the vehicle-body structure of the vehicle according to the present invention, the inclined portion is formed in the shape inclined from the position on the vehicle-width-direction inner side relative to the end on the vehicle-width-direction outer side, and thus, without deteriorating the formability of the outer body, the deformation strength of the outer body against the pressure load from the vehicle front side can be secured, so that the receding of the front wheel toward the vehicle-width-direction inner side can be stably prevented.

Furthermore, in the present invention, preferably, further provided are a clamshell side door which closes, in a freely openable and closable manner, a doorway which is formed on a vehicle upper side of the side sill and through which an occupant enters and exits, and a striker which is disposed at the side sill and with which a latch provided at the side door engages, wherein the striker is disposed, in the outer body of the side sill outer, at a top face on the vehicle rear side relative to the inclined portion.

According to the vehicle-body structure of the vehicle of the present invention configured in this way, compared with a case where the striker is provided at the inclined portion of the outer body, an upper end position of the striker can be located further on the vehicle lower side. Thus, reduction of accessibility of the occupant due to the striker can be prevented.

Thereby, in the vehicle-body structure of the vehicle according to the present invention, the deformation strength of the outer body against the pressure load from the vehicle front side can be enhanced by the inclined portion without deteriorating the accessibility of the occupant.

Furthermore, in the present invention, preferably, the side sill includes an inner reinforcement member extending in the vehicle front-rear direction along a corner of the inner body of the side sill inner, and an outer reinforcement member extending in the vehicle front-rear direction along a corner of the outer body of the side sill outer; the inner reinforcement member is disposed so as to have a front end located at substantially the same position in the vehicle front-rear direction as a rear end of the inner front end; and the outer reinforcement member is disposed so as to have a front end located on the vehicle rear side relative to the front end of the outer body.

According to the vehicle-body structure of the vehicle of the present invention configured in this way, deformation of a closed cross-section portion formed by the outer body and the inner body is suppressed, and motion of the front wheel in association with the front-end collision can be more effectively controlled.

Specifically, when the front-end collision load acts on the front end of the side sill via the front wheel, deformation of the inner body can be suppressed by the inner reinforcement member without inhibiting the deformation of the inner front end.

Meanwhile, the outer reinforcement member is disposed so that the front end is located on the vehicle rear side relative to the front end of the outer body, and thus, when the front-end collision load acts on the front end of the side sill, in addition to the outer front end, the vicinity of the front end of the outer body can be deformed.

Thus, the front wheel which further recedes in association with the progress of the front-end collision can more stably deflect toward the vehicle-width-direction outer side. Accordingly, in the vehicle-body structure of the vehicle according to the present invention, by the inner reinforcement member and the outer reinforcement member, the front-end collision load acting on the side sill via the front wheel can be further prevented, and the receding of the front wheel toward the vehicle-width-direction inner side can be more stably prevented.

Advantageous Effect of Invention

The present invention can provide the vehicle-body structure of the vehicle which can achieve both absorption of the front-end collision load acting on the side sill via the front wheel and prevention of the receding of the front wheel toward the vehicle-width-direction inner side.

DESCRIPTION OF EMBODIMENT

An embodiment of the present invention will be explained with reference to the following drawings.

A vehicle 1 of the present embodiment is a vehicle whose doorway on a vehicle side face through which an occupant enters and exits is covered by a clamshell side door in a freely openable and closable manner. A vehicle-body structure of the vehicle 1 as described above will be explained with reference to FIGS. 1 to 12.

Figure 1:
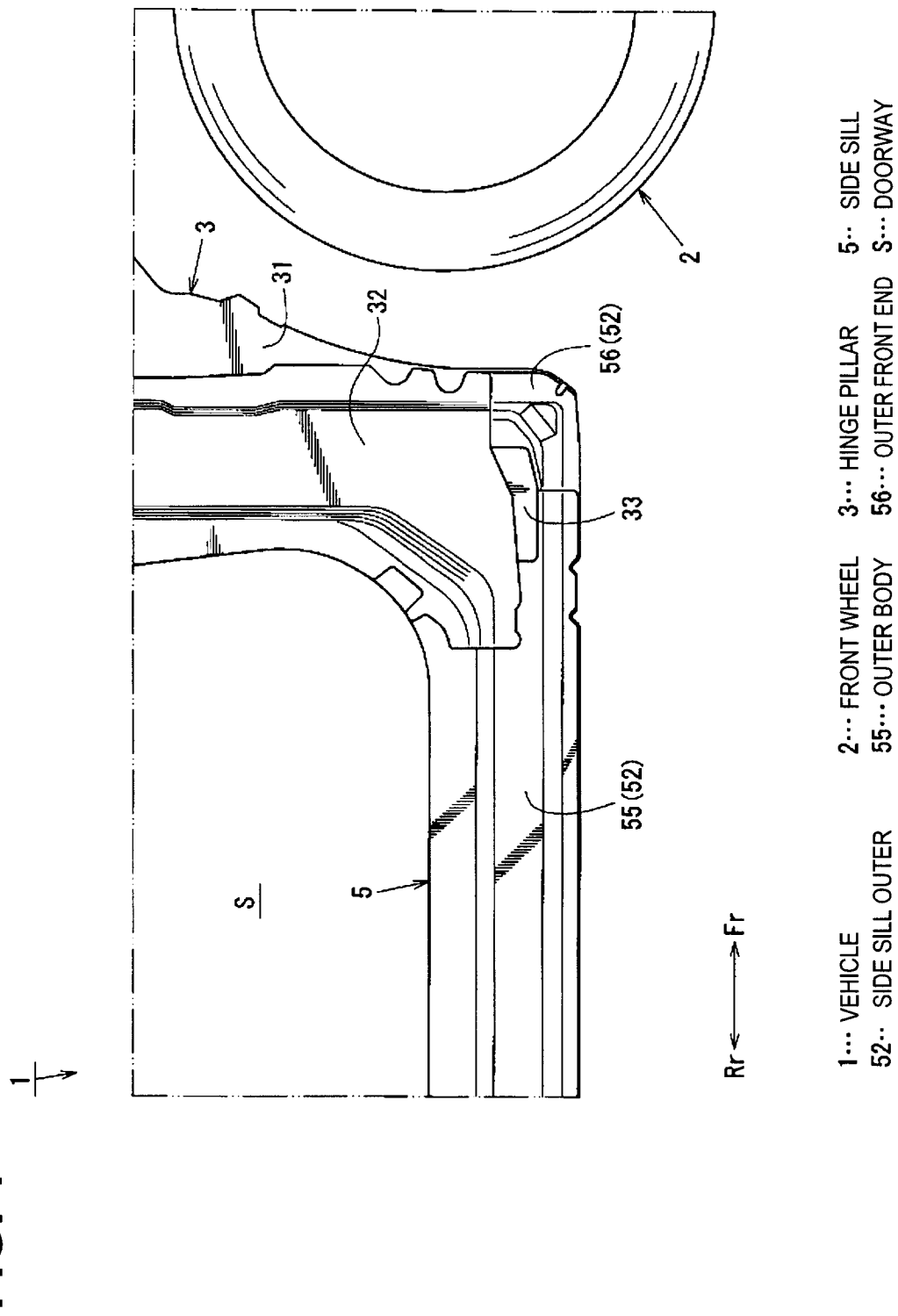
FIG. 1 is a right side view showing, in a right side view, the vicinity of a lower portion of a hinge pillar of a vehicle-body structure of a vehicle according to an embodiment of the present invention.
Figure 2:
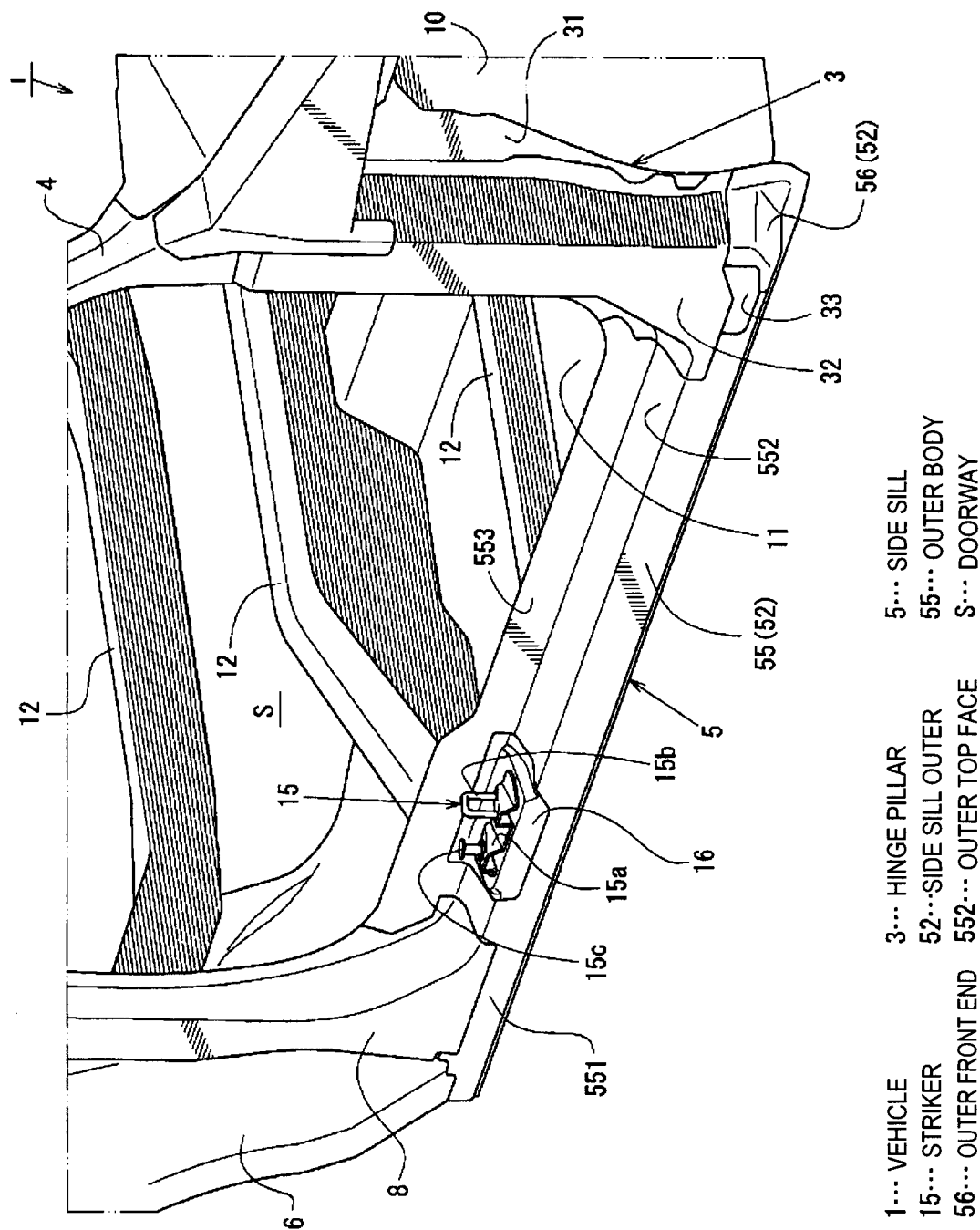
FIG. 2 is an external perspective view showing an exterior of a side vehicle body as viewed from the vehicle-width-direction outer side and the vehicle front side of the vehicle-body structure of the vehicle according to the embodiment of the present invention.
Figure 3:
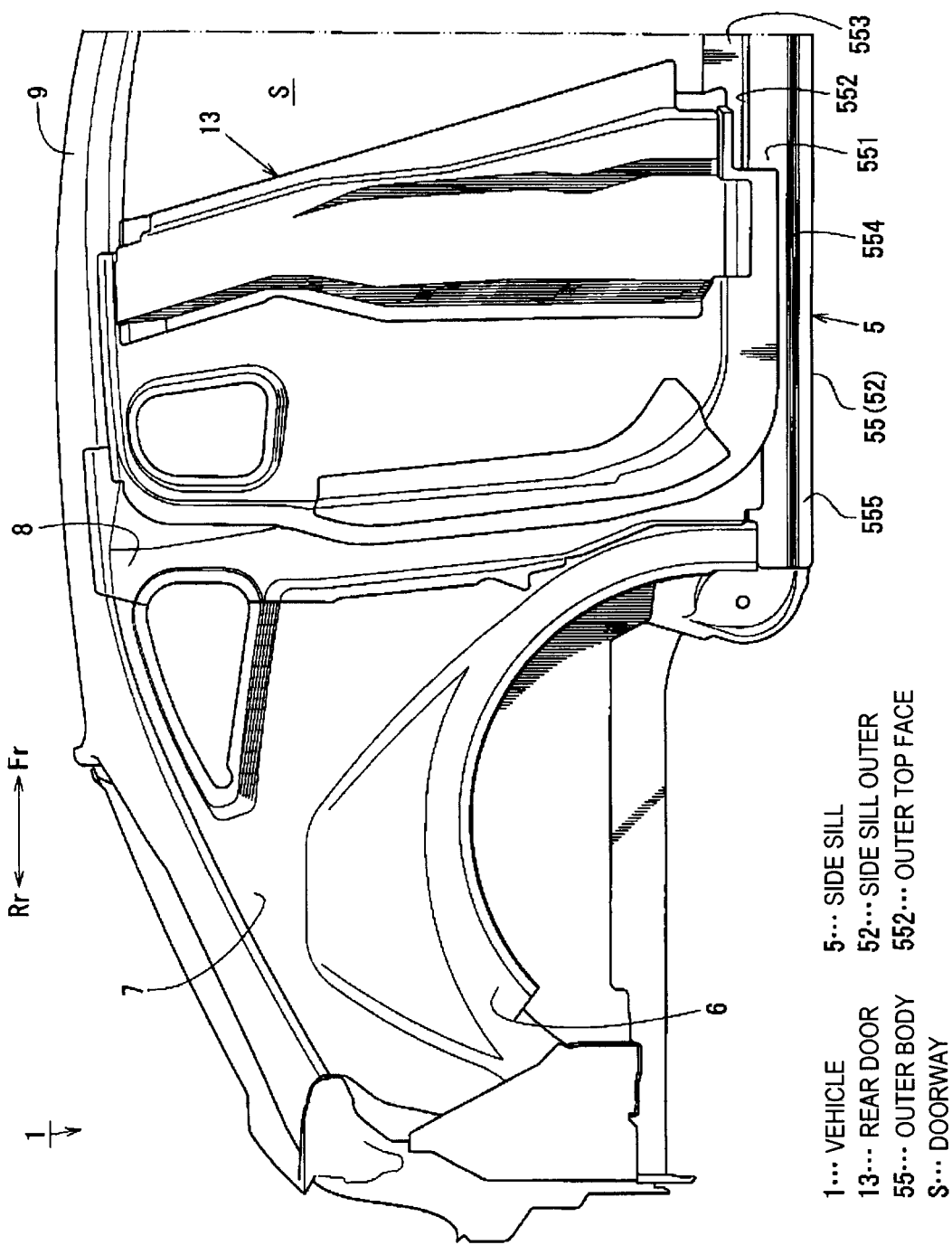
FIG. 3 is a right side view showing, in a right side view, the side vehicle body at a vehicle rear portion of the vehicle-body structure of the vehicle according to the embodiment of the present invention.
Figure 4:
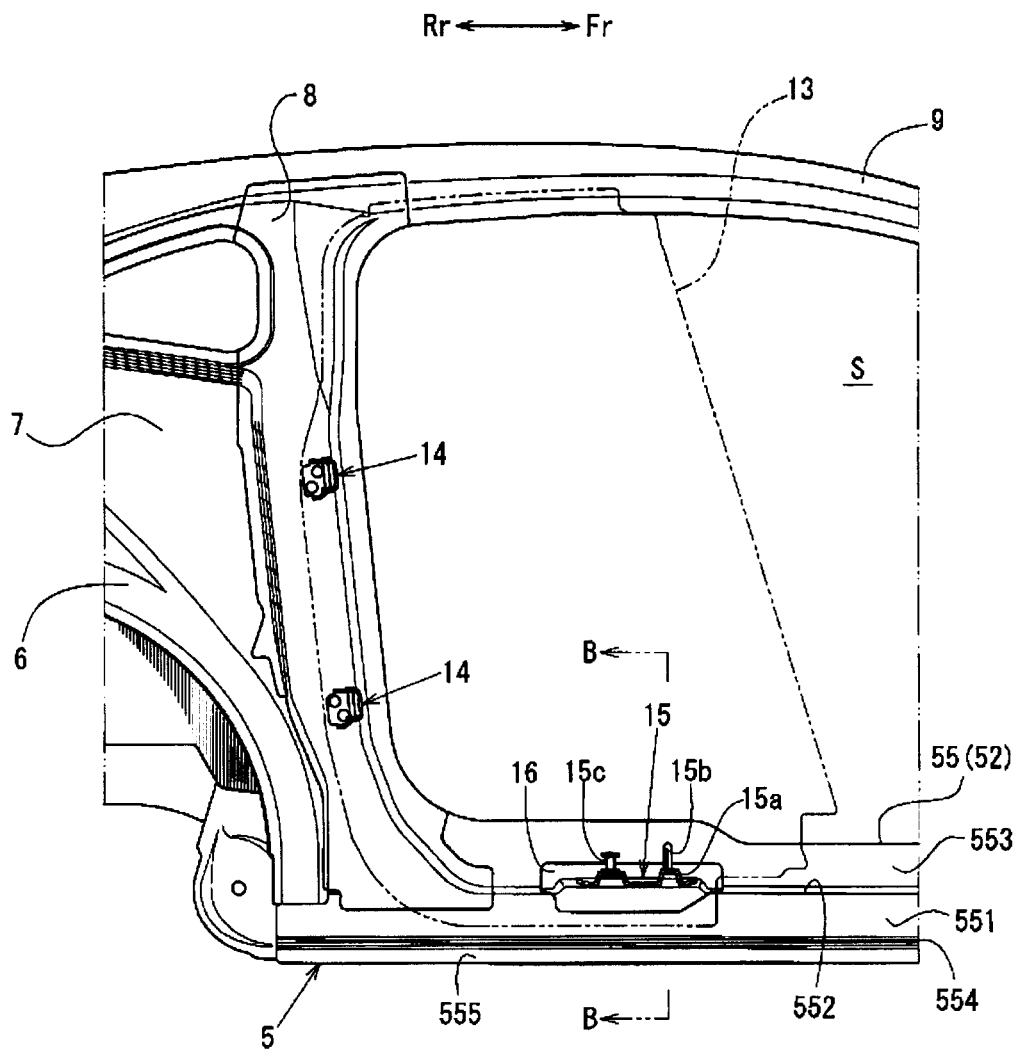
FIG. 4 is a right side view showing, in a right side view, the side vehicle body of the vehicle rear portion of the vehicle-body structure of the vehicle according to the embodiment of the present invention, in a state where a rear door is removed.

FIG. 1 is a right side view of the vicinity of a lower portion of a hinge pillar 3 of the vehicle-body structure of the vehicle according to the embodiment of the present invention; FIG. 2 is an external perspective view of a side vehicle body as viewed from the vehicle-width-direction outer side and the vehicle front side of the vehicle-body structure of the vehicle according to the present embodiment; FIG. 3 is a right side view of the side vehicle body at a vehicle rear portion according to the present embodiment; FIG. 4 is a right side view of the side vehicle body of the vehicle rear portion according to the present embodiment, in a state where a rear door 13 is removed; and FIG. 5 is a right side view of the vicinity of a front end of a side sill 5 according to the present embodiment.

Figure 5:
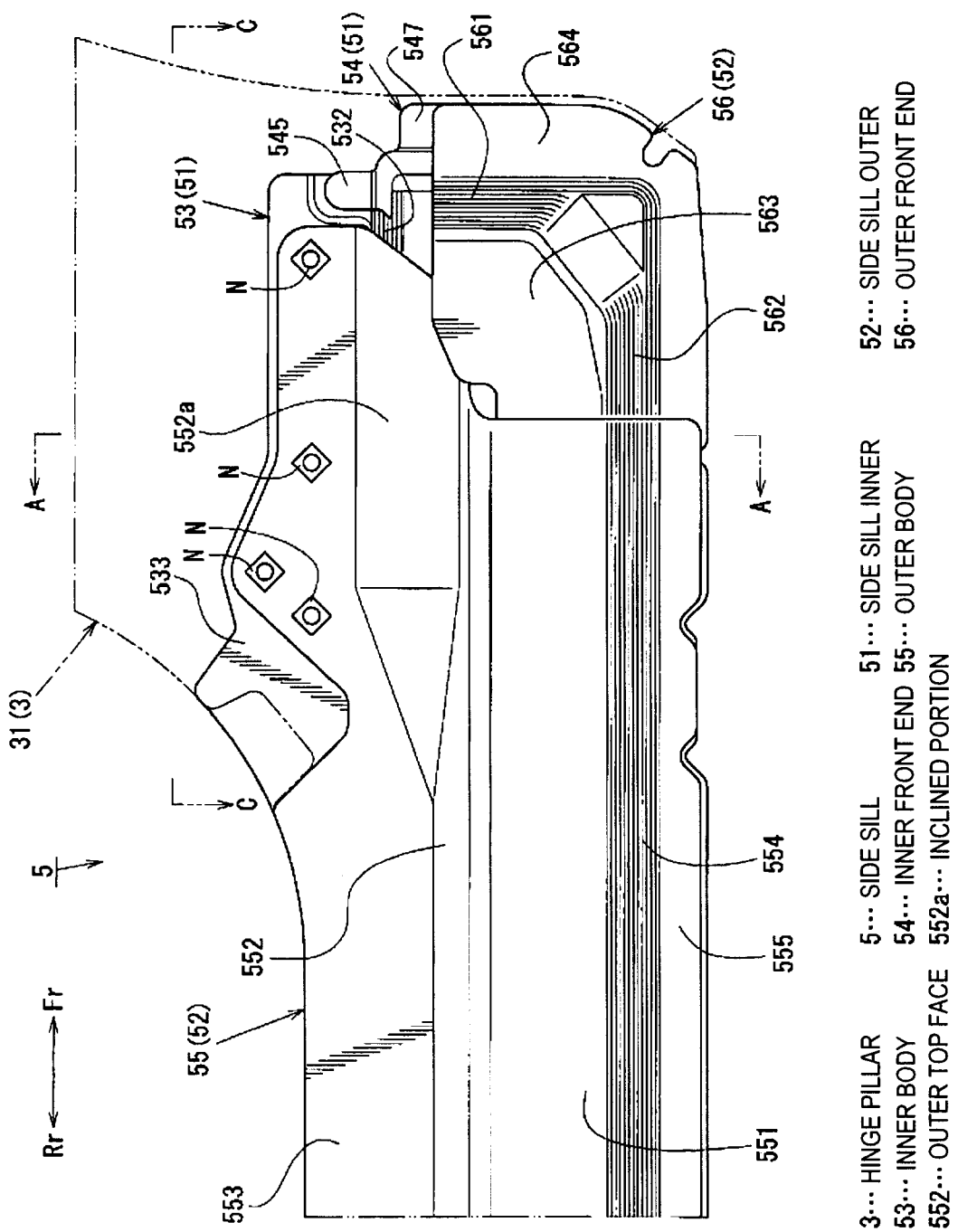
FIG. 5 is a right side view showing, in a right side view, the vicinity of a front end of a side sill of the vehicle-body structure of the vehicle according to the embodiment of the present invention.
Figure 6:
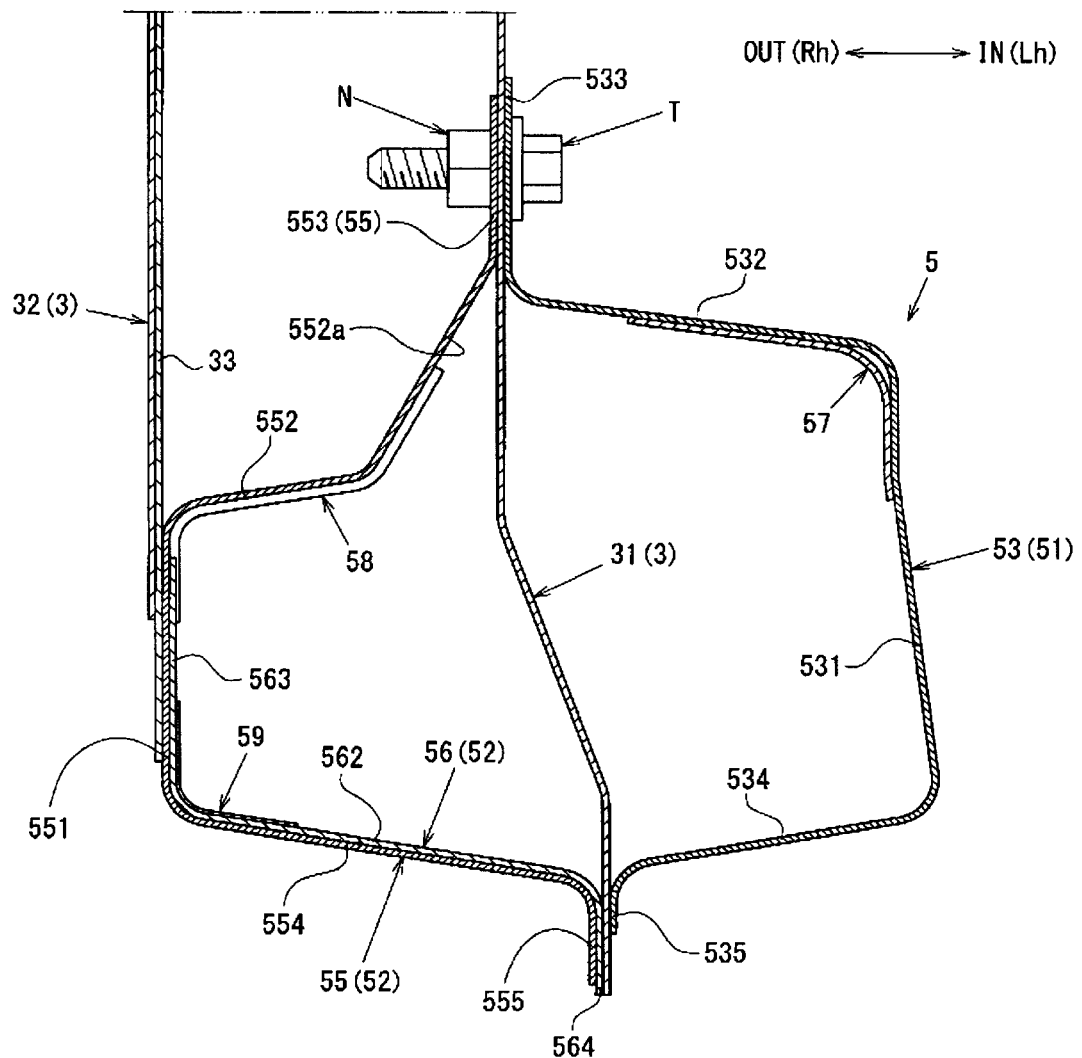
FIG. 6 is an arrow cross-sectional view taken along A-A in FIG. 5.
Figure 7:
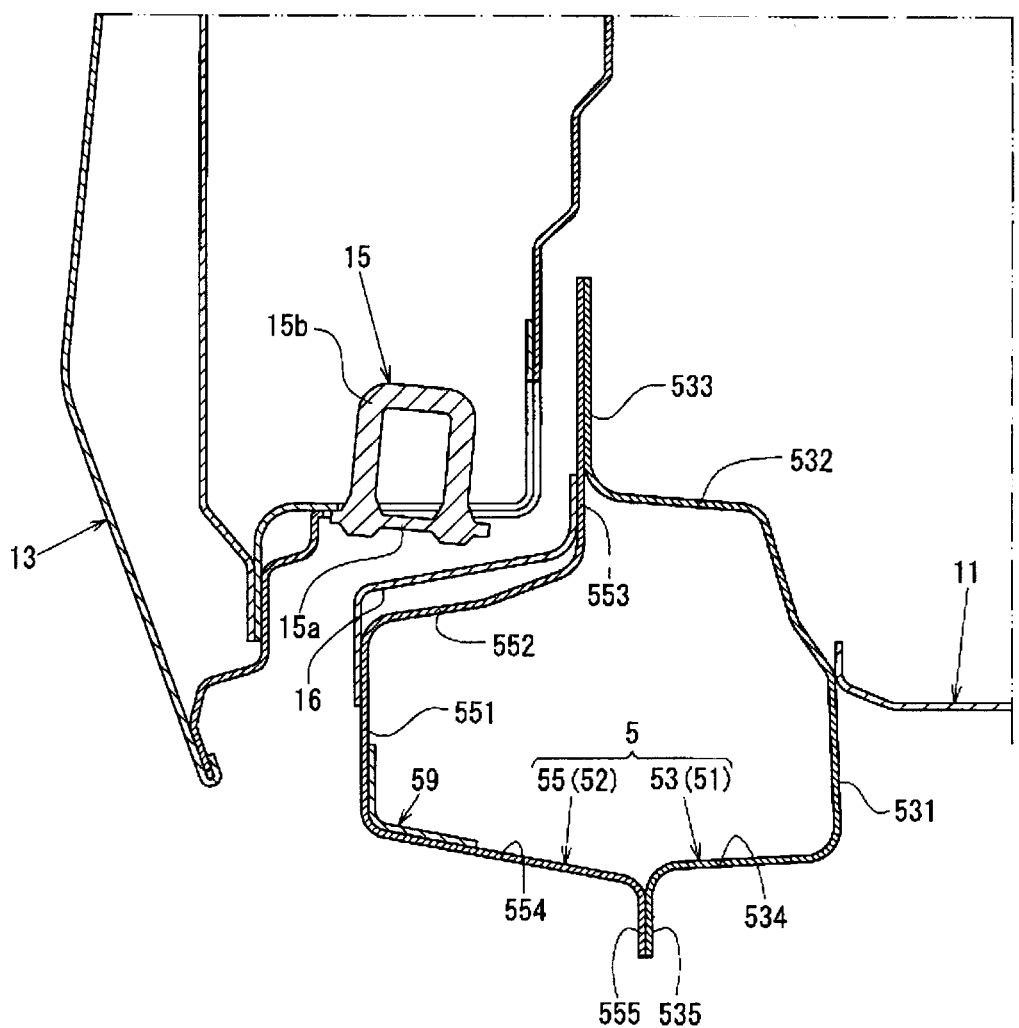
FIG. 7 is an arrow cross-sectional view taken along B-B in FIG. 4.
Figure 8:
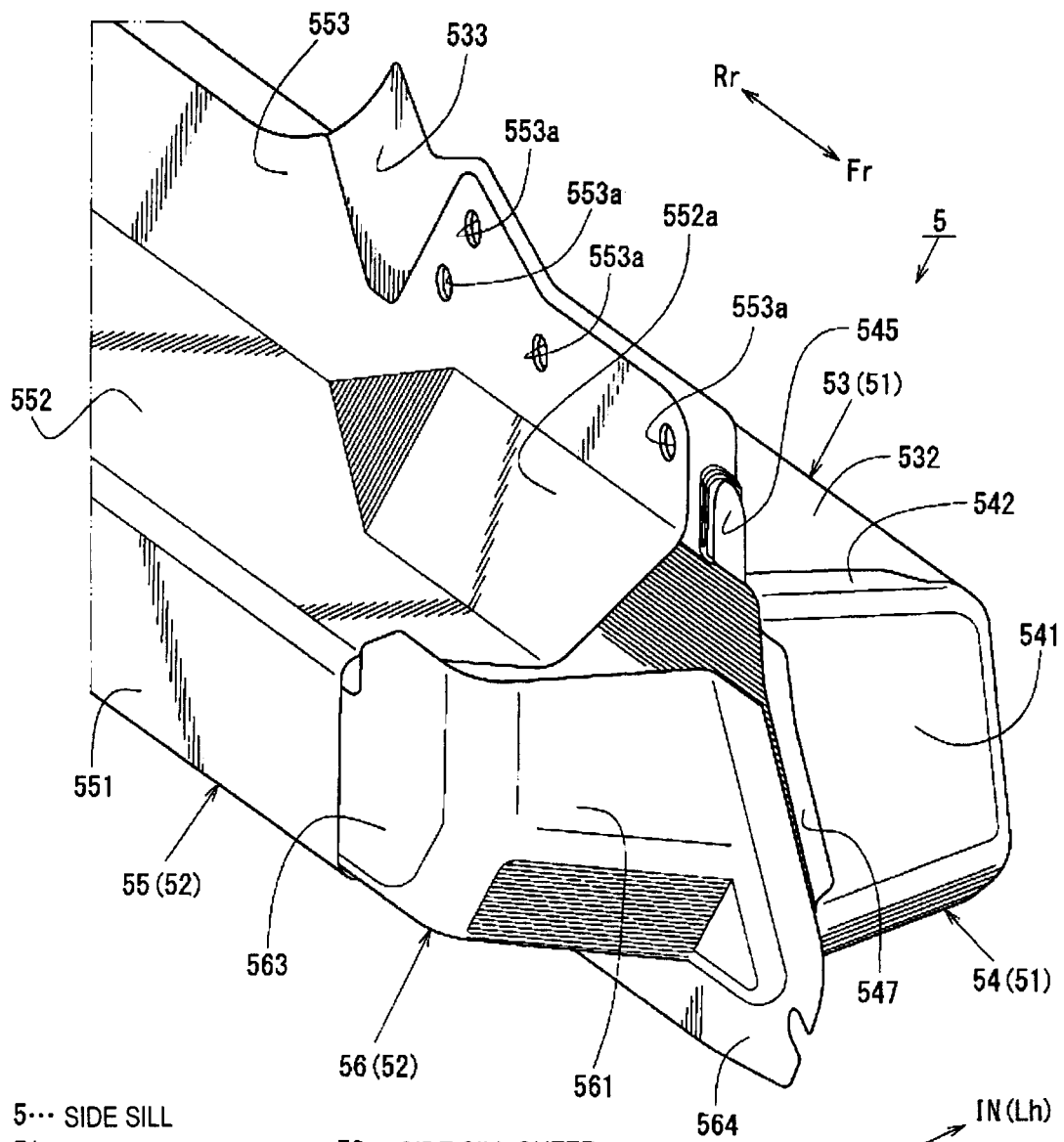
FIG. 8 is an external perspective view showing an exterior in the vicinity of the front end of the side sill as viewed from the vehicle-width-direction outer side and the vehicle upper side of the vehicle-body structure of the vehicle according to the embodiment of the present invention.
Figure 9:
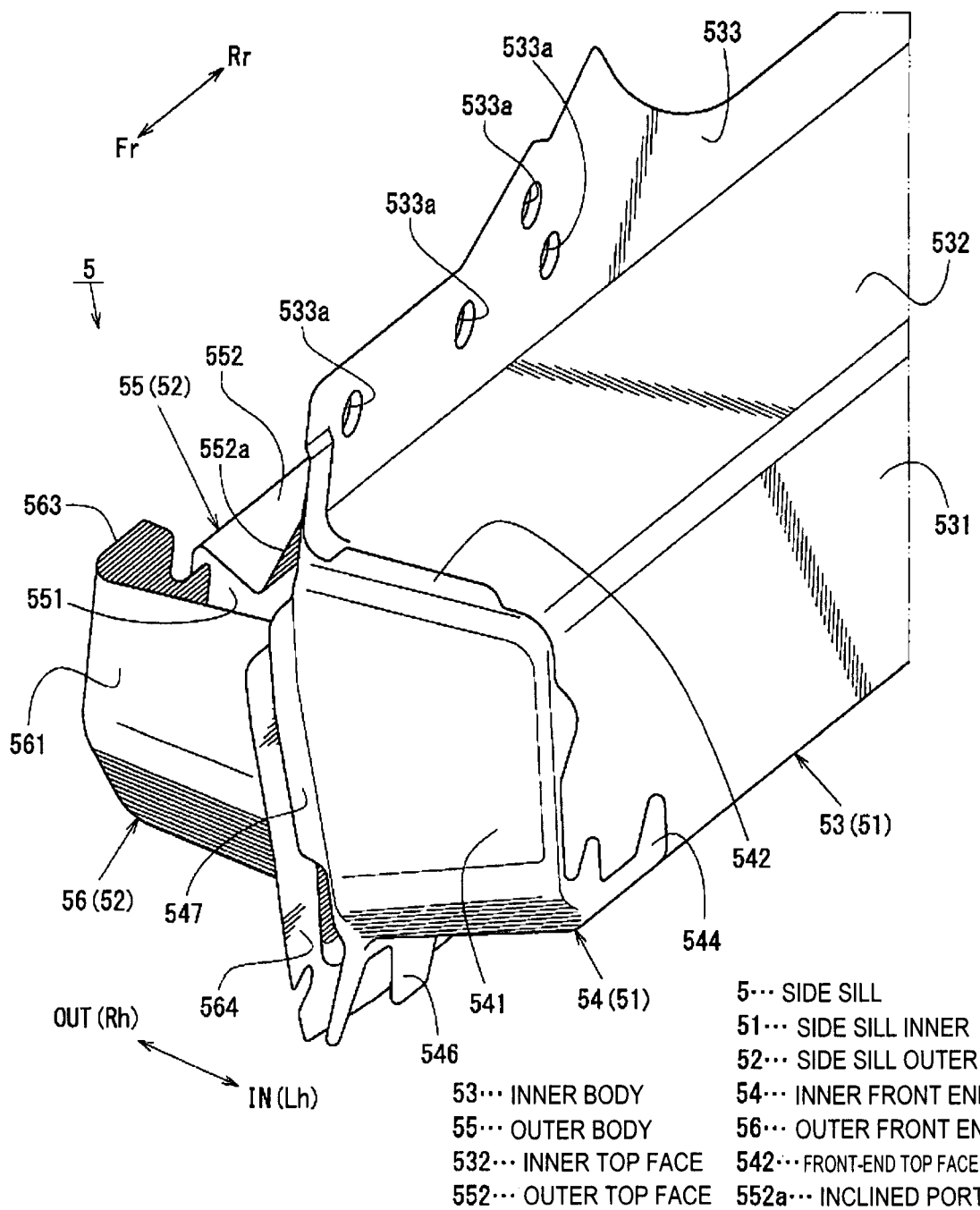
FIG. 9 is an external perspective view showing an exterior in the vicinity of the front end of the side sill as viewed from the vehicle-width-direction inner side and the vehicle upper side of the vehicle-body structure of the vehicle according to the embodiment of the present invention.
Figure 10:
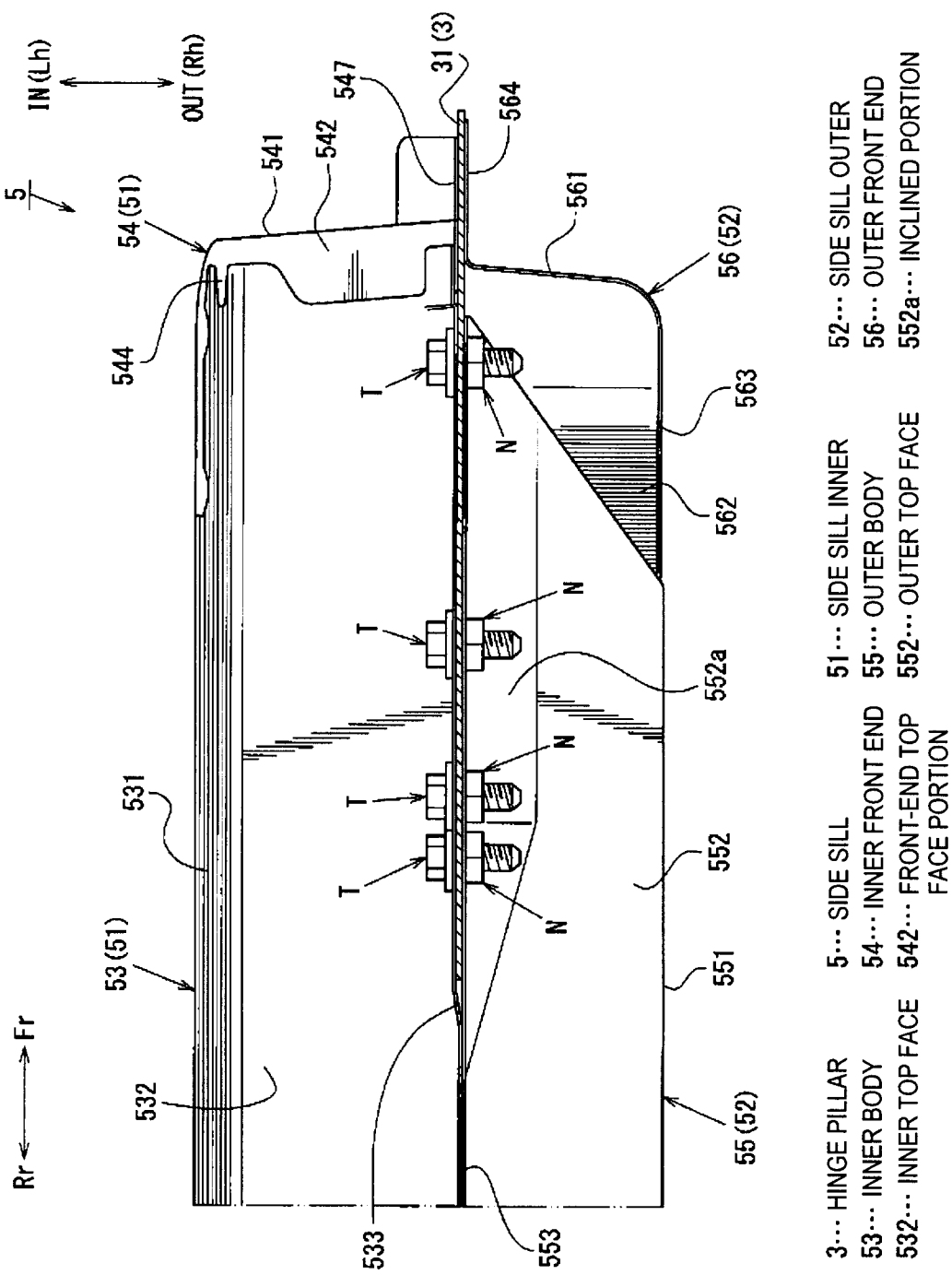
FIG. 10 is an arrow cross-sectional view taken along C-C in FIG. 5.
Figure 11:
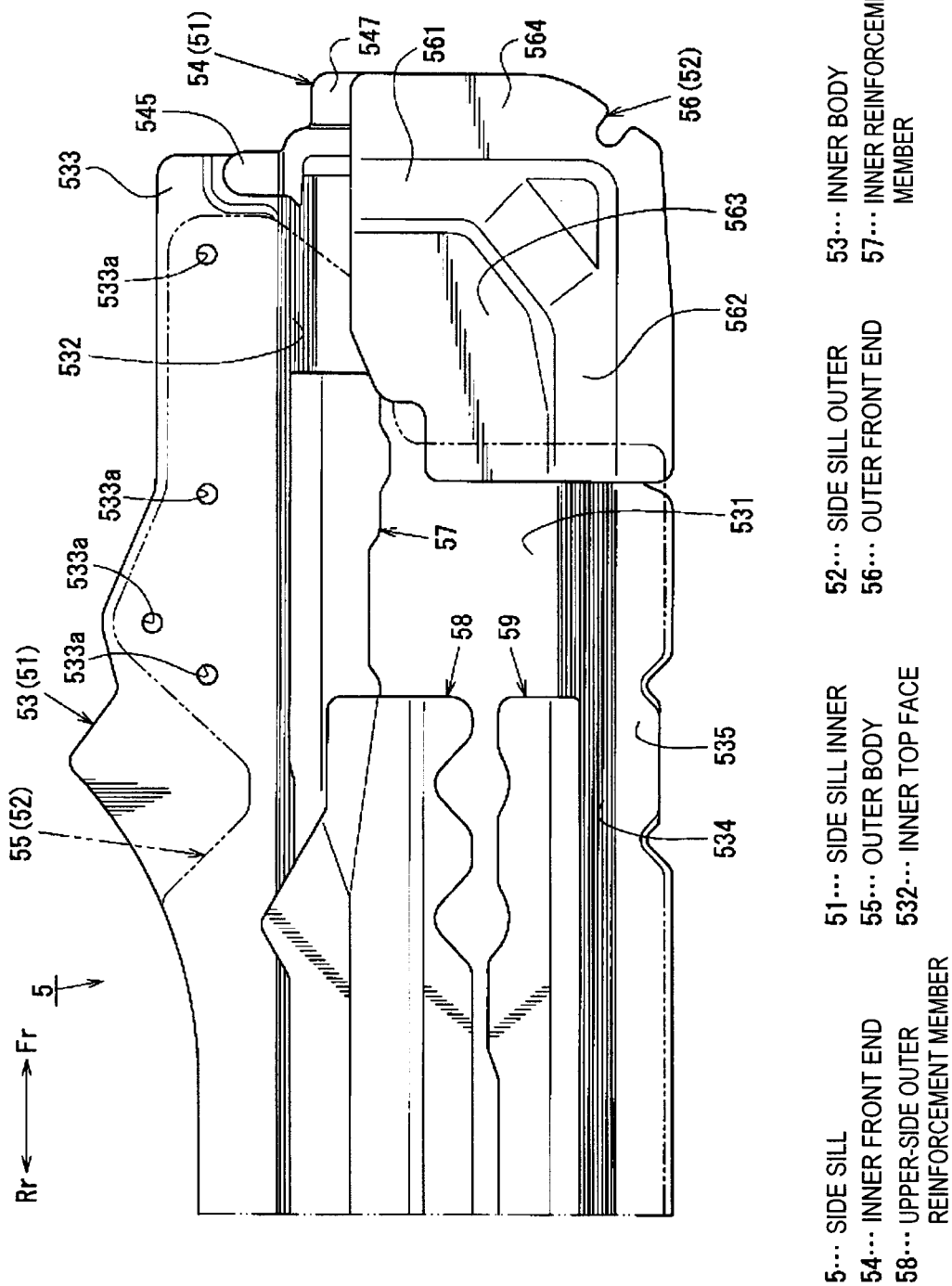
FIG. 11 is a right side view showing, in a right side view, the vicinity of the front end of the side sill of the vehicle-body structure of the vehicle according to the embodiment of the present invention, in a state where an outer body is removed.
Figure 12:
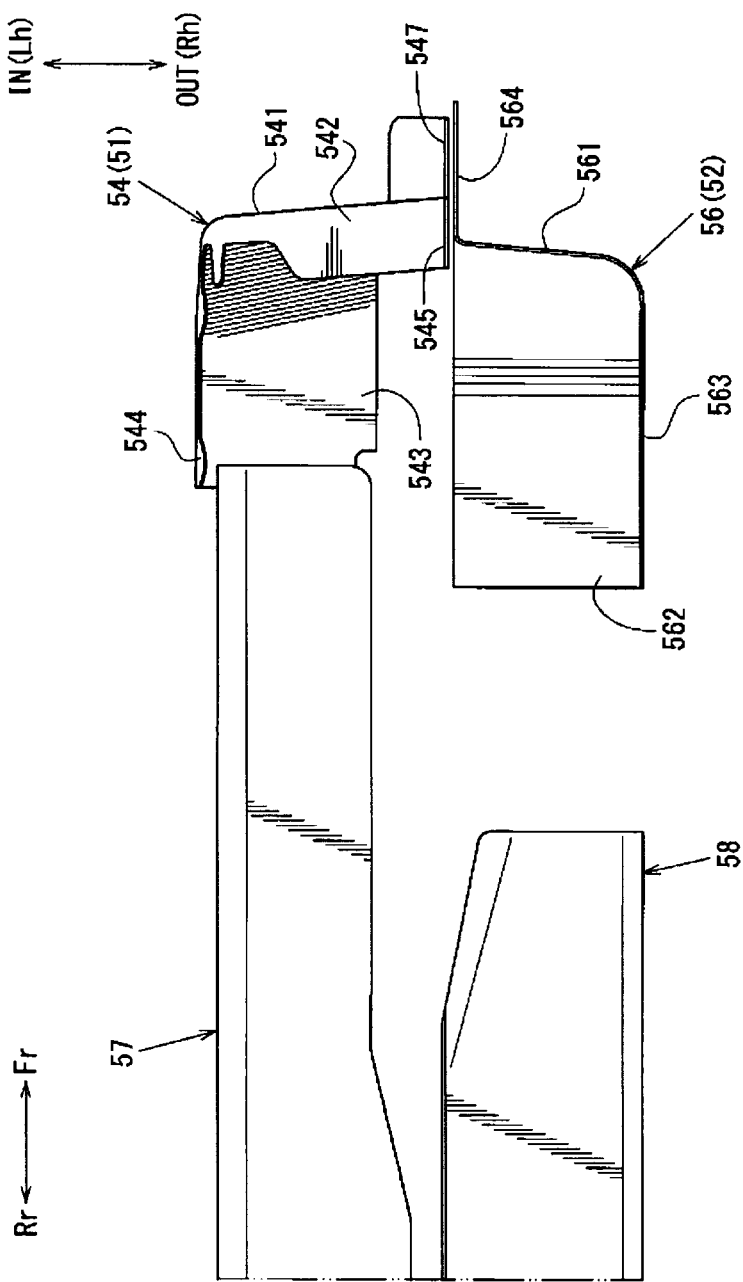
FIG. 12 is a plan view showing, in a plan view, the vicinity of the front end of the side sill of the vehicle-body structure of the vehicle according to the embodiment of the present invention, in a state where an inner body and the outer body are removed.

Furthermore, FIG. 6 is an arrow cross-sectional view taken along A-A in FIG. 5; FIG. 7 is an arrow cross-sectional view taken along B-B in FIG. 4; FIG. 8 is an external perspective view of the vicinity of the front end of the side sill 5 as viewed from the vehicle-width-direction outer side and the vehicle upper side of the vehicle-body structure of the vehicle according to the embodiment of the present invention; FIG. 9 is an external perspective view of the vicinity of the front end of the side sill 5 as viewed from the vehicle-width-direction inner side and the vehicle upper side according to the present embodiment; FIG. 10 is an arrow cross-sectional view taken along C-C in FIG. 5; FIG. 11 is a right side view of the vicinity of the front end of the side sill 5 according to the present embodiment, in a state where an outer body 55 is removed; and FIG. 12 is a plan view of the vicinity of the front end of the side sill 5 according to the present embodiment, in a state where an inner body 53 and the outer body 55 are removed.

Furthermore, for clarity of illustration, in the drawings, the side sill 5 is covered from the vehicle-width-direction outer side, and illustration of an outer panel serving as an exterior design face of the side sill 5 is omitted. Furthermore, illustration of the side door is omitted in FIGS. 1 and 2, illustration of an outer panel of the rear door 13 is omitted in FIG. 3, and illustration of a pillar outer 32 of the hinge pillar 3 is omitted in FIG. 5. In addition, for clarity of illustration, illustration of the hinge pillar 3 is omitted in FIGS. 8 and 9, and illustration of a weld nut N is omitted in FIG. 8.

Furthermore, in the drawings, arrows Fr and Rr indicate the front-rear direction, in which arrow Fr indicates the front side and arrow Rr indicates the rear side.

Furthermore, arrows Rh and Lh indicate the width direction, in which arrow Rh indicates the right direction and arrow Lh indicates the left direction. In addition, arrow IN indicates the vehicle-width-direction inner side, and arrow OUT indicates the vehicle-width-direction outer side.

As shown in FIGS. 1 and 2, the vehicle-body structure of the vehicle 1 in the present embodiment includes a pair of left and right front wheels 2 disposed at a vehicle front portion, the pair of left and right hinge pillars 3 extending in the vehicle up-down direction at a position spaced apart from the front wheels 2 at a predetermined interval on the vehicle rear side, a pair of left and right front pillars 4 extending from upper ends of the hinge pillars 3 toward the vehicle rear upper side, and the pair of left and right side sills 5 extending from lower ends of the hinge pillars 3 toward the vehicle rear side.

Furthermore, as shown in FIGS. 2 and 3, the vehicle-body structure of the vehicle 1 includes a pair of left and right rear wheel wells 6 to which rear ends of the side sills 5 are joined and covering rear wheels (illustration omitted) disposed at the vehicle rear portion; a rear side panel 7 forming a side wall of the vehicle rear portion together with the rear wheel well 6; a side pillar 8 forming a closed cross-section extending in the vehicle up-down direction, together with the rear side panel 7; and a roof side rail 9 connecting a rear end of the front pillar 4 and an upper end of the side pillar 8 in the vehicle front-rear direction.

In addition, as shown in FIG. 2, in the vehicle-body structure of the vehicle 1, the left and right hinge pillars 3 and the front ends of the side sills 5 are connected via a dash panel 10 serving as a panel member forming a front wall of a vehicle cabin, and the left and right side sills 5 are connected via a floor panel 11 serving as a panel member forming a floor of the vehicle cabin, and a plurality of floor cross members 12 forming closed cross-sections extending in the vehicle width direction, together with the floor panel 11.

As shown in FIGS. 2 to 4, the vehicle-body structure of the vehicle 1 forms an opening surrounded by the hinge pillar 3, the side sill 5, the side pillar 8, the front pillar 4, and the roof side rail 9 as a doorway S through which an occupant enters and exits.

As shown in FIG. 3, this doorway S is covered by a side door including the rear door 13 disposed on the vehicle rear side and a front door (illustration omitted) disposed on the vehicle front side of the rear door 13, in a freely openable and closable manner.

More specifically, as shown in FIGS. 3 and 4, the side door of the vehicle 1 is a so-called clamshell side door in which the rear door 13 covering a rear portion of the doorway S is supported by the side pillar 8 via a door hinge 14 in a freely openable and closable manner and in which the front door covering a front portion of the doorway S is supported by the hinge pillar 3 via a door hinge (illustration omitted) in a freely openable and closable manner.

Next, the hinge pillar 3 and the side sill 5 in the present embodiment will be explained in more detail.

As shown in FIGS. 1 and 2, in the hinge pillar 3, a pillar inner 31 serving as a panel member disposed on the vehicle-width-direction inner side and the pillar outer 32 disposed on the vehicle-width-direction outer side with respect to this pillar inner 31 form a closed cross-sectional shape in a substantially rectangular cross-section which extends in the vehicle up-down direction.

As shown in FIGS. 5 and 6, the pillar inner 31 is formed in a shape having a length in the vehicle up-down direction so as to be able to be held by a side sill outer 52 and a side sill inner 51 of the side sill 5 described later. At a lower portion of this pillar inner 31, four insertion holes (illustration omitted) into which a fastening bolt T for fastening and fixing the side sill 5 described later is inserted are formed in an opening manner so as to be spaced apart from each other at predetermined intervals in the vehicle front-rear direction.

As shown in FIGS. 1 and 2, the pillar outer 32 has a cross-sectional shape in a horizontal cross-section along the vehicle width direction which is formed in a substantially hat-shaped cross-sectional shape protruding to the vehicle-width-direction outer side. As shown in FIG. 6, a lower portion of this pillar outer 32 is, at a face on the vehicle-width-direction outermost side, joined to a face on the vehicle-width-direction outer side of the side sill 5 (an outer side face 551 of the side sill outer 52 described later) via a pillar reinforcement 33.

Figure 13:
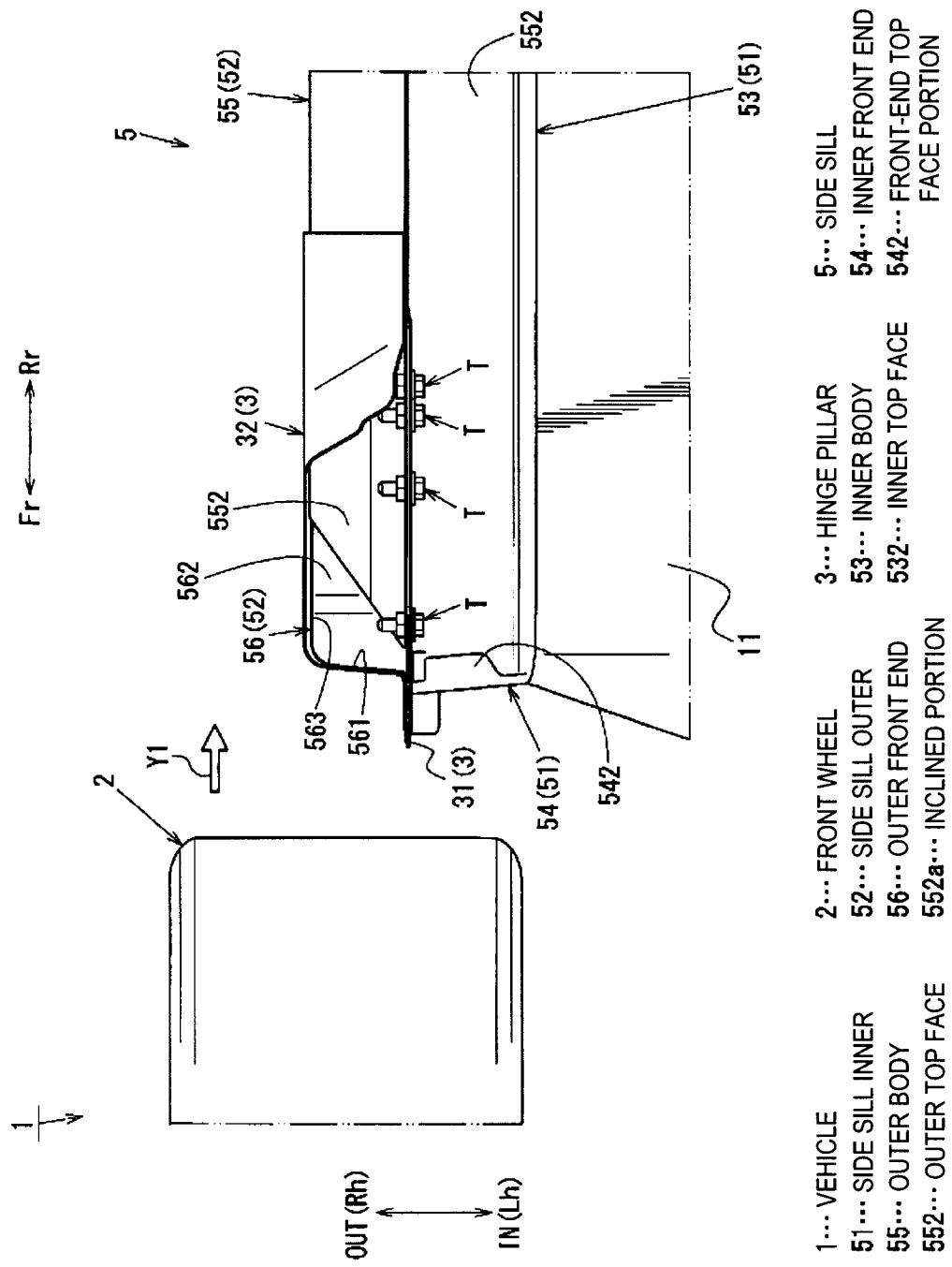
FIG. 13 is an explanatory view for explaining, in the vehicle-body structure of the vehicle according to the embodiment of the present invention, a state where the front wheel has started receding.

Furthermore, the side sill 5 is disposed so that, in a plan view, a vehicle-width-direction substantial center thereof is located at a position offset to the vehicle-width-direction inner side with respect to a vehicle-width-direction substantial center of the front wheel 2 (see FIG. 13). Note that explanation will be made in which a portion serving as a lower end edge of the rear portion of the doorway S is used as a rear portion of the side sill 5 and in which a portion on the vehicle front side relative to the rear portion of the side sill 5 is used as a front portion of the side sill 5.

As shown in FIGS. 4 to 7, this side sill 5 is, in a vertical cross-section along the vehicle width direction, formed in a closed cross-sectional shape in a substantially rectangular cross-section by the side sill inner 51 disposed on the vehicle-width-direction inner side and the side sill outer 52 disposed on the vehicle-width-direction outer side with respect to this side sill inner 51.

Furthermore, as shown in FIGS. 5, 8, and 9, the side sill inner 51 includes the inner body 53 extending from the rear end of the side sill 5 to the vicinity of the front end of the side sill 5, and an inner front end 54 joined to a front end of this inner body 53 and forming a front end of the side sill inner 51.

Meanwhile, as shown in FIGS. 5, 8, and 9, the side sill outer 52 includes the outer body 55 extending from the rear end of the side sill 5 to the vicinity of the front end of the side sill 5, and an outer front end 56 joined to a front end of this outer body 55 and forming a front end of the side sill outer 52.

Namely, the side sill 5 includes a side sill body formed by the inner body 53 and the outer body 55, and a side sill front end formed by the inner front end 54 and the outer front end 56.

The side sill 5 is formed so that deformation strength against a pressure load from the vehicle front side decreases stepwise in the order of the inner body 53, the outer body 55, the inner front end 54, and the outer front end 56. In other words, the side sill 5 is formed so that deformation strength against a pressure load from the vehicle front side increases stepwise in the order of the outer front end 56, the inner front end 54, the outer body 55, and the inner body 53.

Specifically, in the side sill 5, the inner body 53 of the side sill inner 51 is formed of a super high tension steel plate (super high tensile steel plate) having a predetermined thickness, the inner front end 54 is formed of a mild steel plate having a slightly larger thickness than the inner body 53, the outer body 55 of the side sill outer 52 is formed of a super high tension steel plate having a slightly smaller thickness than the inner body 53, and the outer front end 56 is formed of a mild steel plate having a slightly smaller thickness than the outer body 55.

To describe the side sill 5 as described above in more detail, as shown in FIGS. 6 and 7, the inner body 53 has a cross-sectional shape in a vertical cross-section along the vehicle width direction which is a substantially hat-shaped cross-sectional shape protruding to the vehicle-width-direction inner side, and is formed in a shape having a length in the vehicle front-rear direction from the rear end of the side sill 5 up to the vicinity of the front end of the side sill 5.

Specifically, as shown in FIGS. 6 and 7, the inner body 53 is, in the vertical cross-section along the vehicle width direction, formed by integrating an inner side face 531 serving as a side face on the vehicle-width-direction inner side of the side sill 5, an inner top face 532 extending from an upper end of this inner side face 531 toward the vehicle-width-direction outer side, a flange-shaped inner upper-side flange 533 extending from this inner top face 532 toward the vehicle upper side, an inner bottom face 534 extending from a lower end of the inner side face 531 toward the vehicle-width-direction outer side, and a flange-shaped inner lower-side flange 535 extending from this inner bottom face 534 toward the vehicle lower side.

As shown in FIGS. 5 and 8 to 10, the inner side face 531 and the inner top face 532 are, in a side view, formed with a length in the vehicle front-rear direction in which front ends thereof are located on the vehicle front side relative to a vehicle-front-rear-direction substantial center of the pillar inner 31 and slightly on the vehicle rear side relative to the front end of the side sill 5.

As shown in FIGS. 6, 7, and 9, the inner upper-side flange 533 is extended from an edge end on the vehicle-width-direction outer side of the inner top face 532 toward the vehicle upper side. As shown in FIG. 4, the inner upper-side flange 533 is formed in a shape whose length in the vehicle up-down direction at the rear portion of the side sill 5 is longer than that in the vehicle up-down direction at the front portion of the side sill 5.

Furthermore, as shown in FIGS. 6 and 9, in the vicinity of a front end of the inner upper-side flange 533, four bolt insertion holes 533a into which the fastening bolt T is inserted are formed in an opening manner at positions facing to the insertion holes of the pillar inner 31 in the vehicle width direction.

The inner bottom face 534 is, in a plan view, formed with a length in the vehicle front-rear direction in which a front end thereof is located at a position spaced apart from the front end of the inner top face 532 by a predetermined interval on the vehicle rear side.

As shown in FIGS. 6 and 7, the inner lower-side flange 535 is extended toward the vehicle lower side from an edge end on the vehicle-width-direction outer side of the inner bottom face 534.

As shown in FIGS. 6, 11, and 12, at the inner body 53 with the above-described configuration, an inner reinforcement member 57 is disposed so as to extend in the vehicle front-rear direction along a corner formed by the inner side face 531 and the inner top face 532.

As shown in FIG. 6, the inner reinforcement member 57 is, in a vertical cross-section along the vehicle width direction, formed in a substantially L-shaped cross-sectional shape by a substantially flat-shaped portion joined to the vehicle-width-direction inner side of the inner side face 531 and a substantially flat-shaped portion joined to a bottom face of the inner top face 532.

As shown in FIGS. 5, 11, and 12, this inner reinforcement member 57 is disposed so that a front end thereof is located at a position on the vehicle front side relative to the vehicle-front-rear-direction substantial center of the pillar inner 31 and slightly on the vehicle front side relative to a rear end of the inner front end 54 (a rear end of a front-end bottom face portion 543 of the inner front end 54 described later).

Furthermore, as shown in FIGS. 8 and 9, the inner front end 54 of the side sill inner 51 faces to the front wheel 2 and is formed in a shape forming the front end of the side sill 5 together with the outer front end 56.

Specifically, as shown in FIGS. 8 and 9, the inner front end 54 has a thickness in the vehicle front-rear direction and is formed by integrating a front-end front face portion 541 facing to the front wheel 2, a front-end top face portion 542 joined to the inner top face 532, the front-end bottom face portion 543 joined to the inner bottom face 534, an inner-side flange portion 544 joined to the inner side face 531, an outer-side flange portion 545 joined to the inner upper-side flange 533, and a lower-side flange portion 546 and a front-side flange portion 547 which are joined to the pillar inner 31.

As shown in FIGS. 8, 9, and 12, the front-end top face portion 542 is, with a length in the vehicle front-rear direction which overlaps with the vicinity of the front end of the inner top face 532, formed in a shape extending from an upper end of the front-end front face portion 541 toward the vehicle rear side.

As shown in FIGS. 5, 8, 9, and 12, the front-end bottom face portion 543 is formed in a shape in which the rear end thereof is located on the vehicle front side relative to the vehicle-front-rear-direction substantial center of the pillar inner 31 and on the vehicle rear side relative to a rear end of the front-end top face portion 542.

Specifically, the front-end bottom face portion 543 is, with a length in the vehicle front-rear direction which is longer than that of the front-end top face portion 542 in the vehicle front-rear direction, extended from a lower end of the front-end front face portion 541 toward the vehicle rear side.

As shown in FIGS. 9 and 12, the inner-side flange portion 544 is formed in a shape in which a flange-shaped portion extending from an edge end on the vehicle-width-direction inner side of the front-end front face portion 541 toward the vehicle rear side and a flange-shaped portion extending from an edge end on the vehicle-width-direction inner side of the front-end bottom face portion 543 toward the vehicle upper side are integrated.

As shown in FIGS. 8 and 11, the outer-side flange portion 545 is formed so as to extend from an edge end on the vehicle-width-direction outer side of the front-end top face portion 542 toward the vehicle upper side. This outer-side flange portion 545 is extended so as to abut against the inner upper-side flange 533 of the inner body 53 from the vehicle-width-direction outer side.

As shown in FIG. 9, the lower-side flange portion 546 is formed so as to extend in a flange shape from an edge end on the vehicle-width-direction outer side of the front-end bottom face portion 543 toward the vehicle lower side.

As shown in FIG. 9, the front-side flange portion 547 is formed so as to extend in a flange shape from an edge end on the vehicle-width-direction outer side of the front-end front face portion 541 toward the vehicle front side.

Furthermore, as shown in FIGS. 6 and 7, the outer body 55 of the side sill outer 52 has a cross-sectional shape in a vertical cross-section along the vehicle width direction which is a substantially hat-shaped cross-sectional shape protruding to the vehicle-width-direction outer side, and is formed in a shape having a length in the vehicle front-rear direction in which a front end thereof is located on the vehicle rear side with respect to the front end of the inner body 53.

Specifically, as shown in FIGS. 6 and 7, the outer body 55 is, in the vertical cross-section along the vehicle width direction, formed by integrating the outer side face 551 serving as a side face on the vehicle-width-direction outer side of the side sill 5, an outer top face 552 extending from an upper end of this outer side face 551 toward the vehicle-width-direction inner side, an outer upper-side flange 553 extending from this outer top face 552 toward the vehicle upper side, an outer bottom face 554 extending from a lower end of the outer side face 551 toward the vehicle-width-direction inner side, and an outer lower-side flange 555 extending from this outer bottom face 554 toward the vehicle lower side.

As shown in FIGS. 5 and 11, the outer side face 551 is, in a side view, formed with a length in the vehicle front-rear direction in which a front end thereof is located at substantially the same position in the vehicle front-rear direction as the vehicle-front-rear-direction substantial center of the pillar inner 31. In other words, the outer side face 551 is formed with a length in the vehicle front-rear direction in which the front end thereof is located on the vehicle rear side relative to the front end of the inner side face 531 of the inner body 53 and the front end of the inner reinforcement member 57.

As shown in FIG. 10, the outer top face 552 is, in a plan view, formed in a shape having a front end edge inclined from the front end of the outer side face 551 toward the vehicle-width-direction inner side, toward the vicinity of a connecting portion between the inner body 53 and the inner front end 54.

Furthermore, as shown in FIGS. 5, 6, and 8, at the outer top face 552, an inclined portion 552a inclined from the vehicle-width-direction outer side toward the vehicle-width-direction inner side and the vehicle upper side is formed in a range from substantially the same position in the vehicle front-rear direction as a rear end of the side pillar 8 up to a front end of the outer top face 552.

As shown in FIG. 6, this inclined portion 552a has a cross-sectional shape in a vertical cross-section along the vehicle width direction which is formed in a shape inclined from a vehicle-width-direction substantial center of the outer top face 552 toward the vehicle-width-direction inner side and the vehicle upper side so as to connect the vehicle-width-direction substantial center of the outer top face 552 and a vehicle-up-down-direction substantial center of the outer upper-side flange 553.

As shown in FIGS. 5 and 8, a rear portion of the inclined portion 552a is formed in a substantially triangular shape in a side view so as to have a ridge converging toward a boundary between the outer top face 552 and the outer upper-side flange 553.

In addition, as shown in FIGS. 2, 4, and 7, at the outer top face 552 at the rear portion of the side sill 5, a striker 15 with which a latch (illustration omitted) provided at the rear door 13 engages is disposed.

As shown in FIGS. 2 and 4, this striker 15 is formed by integrating a striker base 15a connected to the outer top face 552 of the side sill outer 52, a striker body 15b with which the latch (illustration omitted) provided at the rear door 13 engages, and a catcher pin 15c disposed on the vehicle rear side relative to this striker body 15b for restricting movement of the rear door 13 toward the vehicle-width-direction inner side.

As shown in FIGS. 2, 4, and 7, the striker base 15a is, in a vertical cross-section along the vehicle width direction, connected to the outer top face 552 via a striker reinforcement 16 forming a closed cross-section together with the side sill outer 52.

As shown in FIGS. 6 to 8, the outer upper-side flange 553 is extended from an edge end on the vehicle-width-direction inner side of the outer top face 552 toward the vehicle upper side. As shown in FIG. 4, the outer upper-side flange 553 is formed in a shape whose length in the vehicle up-down direction at the rear portion of the side sill 5 is longer than that in the vehicle up-down direction at the front portion of the side sill 5.

Furthermore, as shown in FIGS. 6 and 8, in the vicinity of a front end of the outer upper-side flange 553, four bolt insertion holes 553a into which the fastening bolt T is inserted are formed in an opening manner at positions facing to the insertion holes of the pillar inner 31 in the vehicle width direction, and the weld nut N into which the fastening bolt T is screwed is welded to a face on the vehicle-width-direction outer side.

As shown in FIGS. 5, 6, and 7, in this outer upper-side flange 553, the front portion of the side sill 5 except for the vicinity of the front end connected to the hinge pillar 3 and the rear portion of the side sill 5 are directly joined to the inner upper-side flange 533 of the side sill inner 51, and the vicinity of the front end connected to the hinge pillar 3 is joined to the inner upper-side flange 533 via the pillar inner 31 and fastened and fixed by the fastening bolt T.

As shown in FIGS. 10 to 12, the outer bottom face 554 is formed in a shape having a front end edge extending in the vehicle width direction at substantially the same position in the vehicle front-rear direction as the front end of the outer side face 551. Namely, the outer bottom face 554 is formed in a shape in which the front end edge thereof is located on the vehicle rear side relative to the outer top face 552.

As shown in FIGS. 6 to 8, the outer lower-side flange 555 is formed so as to extend from an edge end on the vehicle-width-direction inner side of the outer bottom face 554 toward the vehicle lower side. As shown in FIG. 7, this outer lower-side flange 555 is directly joined to the inner lower-side flange 535 of the side sill inner 51.

As shown in FIGS. 6, 11, and 12, at the outer body 55 with the above-described configuration, an upper-side outer reinforcement member 58 extending in the vehicle front-rear direction along a corner formed by the outer side face 551 and the outer top face 552 and a lower-side outer reinforcement member 59 extending in the vehicle front-rear direction along a corner formed by the outer side face 551 and the outer bottom face 554 are disposed.

As shown in FIG. 6, the upper-side outer reinforcement member 58 is, in a vertical cross-section along the vehicle width direction, formed by integrating a substantially flat-shaped portion joined to the vehicle-width-direction inner side of the outer side face 551, a substantially flat-shaped portion joined to a bottom face of the outer top face 552, and a substantially flat-shaped portion joined to the vehicle-width-direction inner side of a lower portion of the outer upper-side flange 553. As shown in FIGS. 5 and 11, this upper-side outer reinforcement member 58 is disposed so that a front end thereof is located on the vehicle rear side relative to the front end of the outer body 55 and at the rear portion of the inclined portion 552a.

As shown in FIG. 6, the lower-side outer reinforcement member 59 is, in a vertical cross-section along the vehicle width direction, formed in a substantially L-shaped cross-sectional shape by a substantially flat-shaped portion joined to the vehicle-width-direction inner side of the outer side face 551 and a substantially flat-shaped portion joined to a top face of the outer bottom face 554. As shown in FIGS. 5 and 11, this lower-side outer reinforcement member 59 is disposed so that a front end thereof is located at substantially the same position in the vehicle front-rear direction as the front end of the upper-side outer reinforcement member 58.

Furthermore, as shown in FIGS. 8 and 9, the outer front end 56 of the side sill outer 52 faces to the front wheel 2 and is formed in a shape forming the front end of the side sill 5 together with the inner front end 54.

Specifically, as shown in FIGS. 8 and 9, the outer front end 56 has a thickness in the vehicle front-rear direction and is formed by integrating a front-end front face portion 561 facing to the front wheel 2, a front-end bottom face portion 562 joined to the outer bottom face 554, a front-end side face portion 563 joined to the outer side face 551, and a flange portion 564 joined to the pillar inner 31.

As shown in FIG. 10, the front-end front face portion 561 is, in a plan view, disposed at substantially the same position in the vehicle front-rear direction as the front end of the inner top face 532 of the inner body 53. The front-end front face portion 561 is, in a plan view, formed in a shape in which the vehicle-width-direction outer side is located slightly on the vehicle rear side relative to the vehicle-width-direction inner side.

As shown in FIGS. 5 and 11, the front-end bottom face portion 562 is, with a length in the vehicle front-rear direction which overlaps with the vicinity of a front end of the outer bottom face 554 of the outer body 55, formed in a shape extending from a lower end of the front-end front face portion 561 toward the vehicle rear side.

As shown in FIGS. 5 and 11, the front-end side face portion 563 is, with a length in the vehicle front-rear direction which overlaps with the vicinity of a front end of the outer side face 551 of the outer body 55, formed in a shape extending from an edge end on the vehicle-width-direction outer side of the front-end front face portion 561 toward the vehicle rear side. As shown in FIGS. 6, 8, and 11, this front-end side face portion 563 is joined to the vehicle-width-direction inner side of the outer side face 551.

As shown in FIGS. 5 and 11, the flange portion 564 is formed in a shape in which a flange-shaped portion extending from an edge end on the vehicle-width-direction inner side of the front-end front face portion 561 toward the vehicle front side and a flange-shaped portion extending from a lower end of the front-end bottom face portion 562 toward the vehicle lower side are integrated.

As shown in FIG. 10, in this flange portion 564, the portion extended from the front-end front face portion 561 is joined to the front-side flange portion 547 of the outer front end 56 via the pillar inner 31 of the hinge pillar 3, and the portion extended from the front-end bottom face portion 562 is joined to the lower-side flange portion 546 of the outer front end 56 via the pillar inner 31 of the hinge pillar 3.

Subsequently, a deformation state of the side sill 5 at the time of receding of the front wheel 2 due to, for example, a small overlap collision in the vehicle 1 of the present embodiment with the above-described configuration, and operations and effects of the vehicle-body structure of the vehicle according to the embodiment of the present invention will be explained in detail with reference to FIGS. 13 to 15.

FIG. 13 is an explanatory view for explaining, in the vehicle-body structure of the vehicle according to the embodiment of the present invention, a state where the front wheel 2 has started receding; FIG. 14 is an explanatory view for explaining, in the present embodiment, a state of the side sill 5 which has started deformation; and FIG. 15 is an explanatory view for explaining, in the present embodiment, a state where the front wheel 2 recedes toward the vehicle-width-direction outer side.

First, when the vehicle front portion of the vehicle 1 collides with a collided object, if a relatively large front-end collision load is applied to the front wheel 2 as in, for example, a small overlap collision, the front wheel 2 starts receding toward the vehicle rear side along arrow Y1 as shown in FIG. 13.

Then, if the front wheel 2 contacts the front-side flange portion 547 of the inner front end 54, the pillar inner 31 of the hinge pillar 3, and a flange of the side sill 5 which is formed by the flange portion 564 of the outer front end 56, the side sill 5 starts deformation due to the front-end collision load acting via the front wheel 2.

At this time, in the present embodiment, the deformation strength against the pressure load from the vehicle front side is lower in the inner front end 54 and the outer front end 56 than in the inner body 53 and the outer body 55, and thus the side sill 5 starts the deformation at the inner front end 54 and the outer front end 56 substantially simultaneously, ahead of the inner body 53 and the outer body 55.

Figure 14:
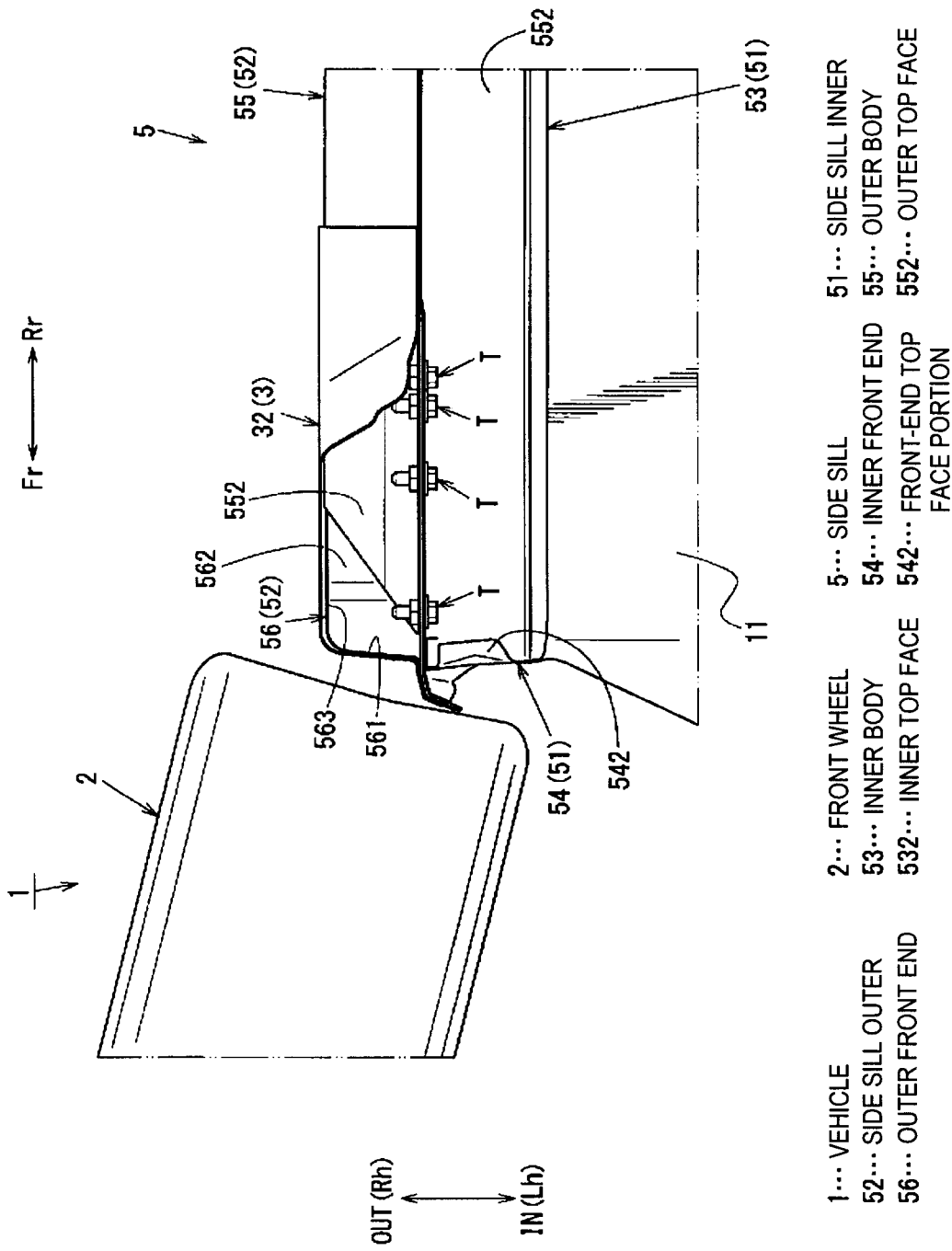
FIG. 14 is an explanatory view for explaining, in the vehicle-body structure of the vehicle according to the embodiment of the present invention, a state of the side sill which has started deformation.

As shown in FIG. 14, in the side sill 5 which has started the deformation, the front-side flange portion 547 of the inner front end 54 and the flange portion 564 of the outer front end 56 are bent and deformed toward the vehicle-width-direction inner side together with the pillar inner 31 of the hinge pillar 3.

Furthermore, by the front-end collision load acting on the side sill 5 via the front wheel 2, the side sill 5 is deformed at, as shown in FIG. 14, the front-end top face portion 542 of the inner front end 54 and the front-end bottom face portion 543.

At this time, in the present embodiment, the deformation strength against the pressure load from the vehicle front side is higher in the inner body 53 than in the inner front end 54, and the length of the front-end top face portion 542 of the inner front end 54 in the vehicle front-rear direction is shorter than that of the front-end bottom face portion 543 in the vehicle front-rear direction. Thus, the inner front end 54 is deformed so that, while the front-end bottom face portion 543 is buckled and deformed, the front-end top face portion 542 is collapsed.

Thereafter, if the front wheel 2 further recedes in association with the progress of the front-end collision, the front wheel 2 presses the outer front end 56 toward the vehicle rear side and further presses the inner body 53 toward the vehicle rear side via the inner front end 54.

At this time, in the present embodiment, the deformation strength against the pressure load from the vehicle front side is lower in the outer front end 56 than in the inner body 53, and the upper-side outer reinforcement member 58 and the lower-side outer reinforcement member 59 are disposed on the vehicle rear side relative to the front end of the outer body 55. Thus, as shown in FIG. 15, the side sill 5 is deformed so that the outer front end 56 is collapsed, and the vicinity of the front end of the outer body 55 is buckled and deformed.

Figure 15:
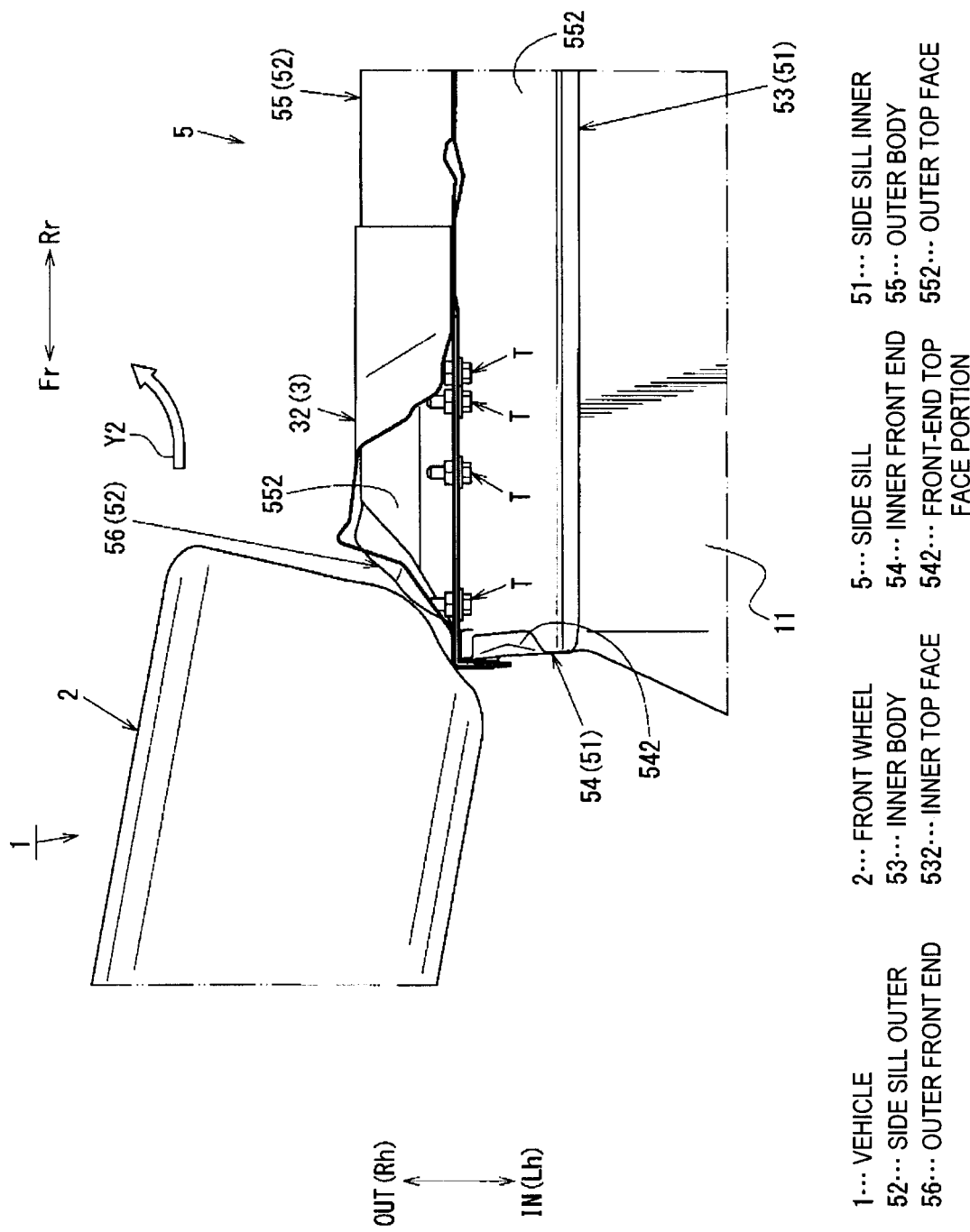
FIG. 15 is an explanatory view for explaining, in the vehicle-body structure of the vehicle according to the embodiment of the present invention, a state where the front wheel recedes toward the vehicle-width-direction outer side.

Furthermore, on the vehicle rear side relative to the hinge pillar 3, as shown in FIG. 15, a joining portion between the inner upper-side flange 533 of the inner body 53 and the outer upper-side flange 553 of the outer body 55 is released by the front-end collision load from the vehicle front side, namely, opening deformation occurs.

Meanwhile, as shown in FIG. 15, the front wheel 2 which recedes in association with the progress of the front-end collision further recedes while deflecting toward the vehicle-width-direction outer side along the direction of arrow Y2 so as to be guided to the front end of the outer top face 552 by the relationship of the relative position offset to the vehicle-width-direction outer side with respect to the side sill 5 and the front end shape of the outer top face 552 of the outer body 55.

Thus, in the vehicle-body structure of the vehicle 1 according to the present embodiment, when the vehicle front portion collides with a collided object, the front-end collision load acting on the side sill 5 via the front wheel 2 is absorbed by the deformation of the side sill 5, and the front wheel 2 recedes so as to be guided toward the vehicle-width-direction outer side.

As described above, the vehicle-body structure of the vehicle 1 according to the embodiment of the present invention includes the pair of left and right front wheels 2 disposed so as to be spaced apart from each other at a predetermined interval in the vehicle width direction of the vehicle 1, and the pair of left and right side sills 5 in which the side sill outer 52 and the side sill inner 51 which are joined along the vehicle width direction form a closed cross-section extending in the vehicle front-rear direction; the side sill inner 51 includes the inner body 53 formed so as to have an open cross-section open on the vehicle-width-direction outer side which extends in the vehicle front-rear direction, and the inner front end 54 connected to the front end of the inner body 53 and facing to the front wheel 2 so as to serve as a front end portion of the side sill 5; the side sill outer 52 includes the outer body 55 formed so as to have an open cross-section open on the vehicle-width-direction inner side which extends in the vehicle front-rear direction, and the outer front end 56 connected to the front end of the outer body 55 and facing to the front wheel 2 so as to serve as a front end portion of the side sill 5; and the inner body 53, the outer body 55, the inner front end 54, and the outer front end 56 are configured in such a manner that the deformation strength against the pressure load from the vehicle front side decreases stepwise in this order. Thus, both absorption of the front-end collision load acting on the side sill 5 via the front wheel 2 and prevention of the receding of the front wheel 2 toward the vehicle-width-direction inner side can be achieved.

Specifically, in the present embodiment, the deformation strength against the pressure load from the vehicle front side is lower in the inner front end 54 and the outer front end 56 than in the inner body 53 and the outer body 55, and thus, when the pressure load from the vehicle front side acts on the front end of the side sill 5, the outer front end 56 and the inner front end 54 can start deformation substantially simultaneously.

Thus, compared with a case where the inner front end 54 is not deformed, the front-end collision load via the front wheel 2 can stably act on the outer front end 56, and the front-end collision load acting on the side sill 5 via the front wheel 2 can be stably absorbed by the deformation of the inner front end 54 and the deformation of the outer front end 56.

Furthermore, the deformation strength against the pressure load from the vehicle front side is lower in the outer front end 56 than in the inner front end 54, and thus the outer front end 56 can be more actively deformed than the inner front end 54. Thus, the deformation amount at the front end of the side sill outer 52 can be made larger than that at the front end of the side sill inner 51.

Thereby, when the front wheel 2 in contact with the front end of the side sill 5 further recedes in association with the progress of the front-end collision, the front wheel 2 can deflect toward the vehicle-width-direction outer side.

Accordingly, the vehicle-body structure of the vehicle 1 according to the present embodiment can achieve both absorption of the front-end collision load acting on the side sill 5 via the front wheel 2 and prevention of the receding of the front wheel 2 toward the vehicle-width-direction inner side.

Furthermore, in the vehicle-body structure of the vehicle 1 according to the present embodiment, the inner front end 54 includes the front-end top face portion 542 and the front-end bottom face portion 543 which face to each other in the vehicle up-down direction, and the front-end top face portion 542 of the inner front end 54 is formed in the shape having the length in the vehicle front-rear direction which is shorter than that of the front-end bottom face portion 543 of the inner front end 54 in the vehicle front-rear direction. Thus, when the front wheel 2 recedes in association with the front-end collision, while the front wheel 2 can early abut against the inner body 53 whose deformation strength against the pressure load from the vehicle front side is higher than that of the inner front end 54, the front-end collision load acting on the inner front end 54 can be absorbed by deformation of the front-end bottom face portion 543 of the inner front end 54.

Thus, without deteriorating the function of absorbing the front-end collision load at the inner front end 54, a larger difference between the deformation amount of the inner front end 54 and the deformation amount of the outer front end 56 can be secured.

Furthermore, the front-end bottom face portion 543 of the inner front end 54 is more greatly deformed than the front-end top face portion 542 of the inner front end 54, and thus the front wheel 2 which recedes in association with the progress of the front-end collision can be easily guided toward the vehicle lower side.

Accordingly, in the vehicle-body structure of the vehicle 1 according to the present embodiment, the receding of the front wheel 2 toward the vehicle upper side and the vehicle-width-direction inner side can be prevented by the inner front end 54 having the front-end top face portion 542 whose length in the vehicle front-rear direction is shorter than that of the front-end bottom face portion 543.

Furthermore, the vehicle-body structure of the vehicle 1 of the present embodiment includes the pair of left and right hinge pillars 3 extending in the vehicle up-down direction and each having the lower end connected to the vicinity of the front end of the side sill 5, and the outer body 55 and the inner body 53 are fastened and fixed to the lower ends of the hinge pillars 3 at a plurality of areas. Thus, for example, compared with a case where the hinge pillar 3 and the side sill 5 are welded, connecting strength between the hinge pillar 3 and the side sill 5 can be enhanced. Thus, the vicinity of the front end of the outer body 55 and the vicinity of the front end of the inner body 53 can be made higher in rigidity than the outer front end 56 and the inner front end 54.

Thereby, when the front wheel 2 which has receded in association with the front-end collision contacts the front end of the side sill 5, deformation of the outer body 55 and inner body 53 due to the front-end collision load acting on the front end of the side sill 5 via the front wheel 2 can be suppressed. Thus, the front wheel 2 which further recedes in association with the progress of the front-end collision can reliably deflect toward the vehicle-width-direction outer side.

Furthermore, the front-end collision load acting on the front end of the side sill 5 can be transferred to the farther side of the vehicle body via the outer body 55, the inner body 53, and the hinge pillar 3.

Accordingly, in the vehicle-body structure of the vehicle 1 according to the present embodiment, fastening and fixing the side sill 5 to the hinge pillar 3 can reliably prevent the receding of the front wheel 2 toward the vehicle-width-direction inner side.

Furthermore, in the vehicle-body structure of the vehicle 1 according to the present embodiment, in a plan view, the outer top face 552 of the outer body 55 is formed in the shape having the front end edge inclined from the vicinity of a boundary between the inner top face 532 of the inner body 53 and the front-end top face portion 542 of the inner front end 54 toward the vehicle rear side and the vehicle-width-direction outer side. Thus, the front end edge of the outer top face 552 of the outer body 55 can function as a guide portion which guides the front wheel 2 toward the vehicle rear side and the vehicle-width-direction outer side.

Thus, the front wheel 2 which recedes in association with the progress of the front-end collision can more reliably deflect toward the vehicle-width-direction outer side.

Accordingly, in the vehicle-body structure of the vehicle 1 according to the present embodiment, the outer top face 552 of the outer body 55 which has the front end inclined toward the vehicle rear side and the vehicle-width-direction outer side can more reliably prevent the receding of the front wheel 2 toward the vehicle-width-direction inner side.

Furthermore, in the vehicle-body structure of the vehicle 1 according to the present embodiment, the outer top face 552 in the vicinity of the front end of the outer body 55 includes the inclined portion 552a inclined in such a manner that, in a front view, an end thereof on the vehicle-width-direction inner side is located on the vehicle upper side with respect to an end thereof on the vehicle-width-direction outer side, and thus a length of the outer top face 552 in the vehicle up-down direction and a cross-sectional area thereof in the vicinity of the front end of the outer body 55 can be more greatly secured. Thus, the deformation strength of the outer body 55 against the pressure load from the vehicle front side can be enhanced.

Thereby, the front wheel 2 which recedes in association with the progress of the front-end collision can further reliably deflect toward the vehicle-width-direction outer side along the front end edge of the outer top face 552 of the outer body 55.

Accordingly, in the vehicle-body structure of the vehicle 1 according to the present embodiment, the inclined portion 552a provided at the outer body 55 can further reliably prevent the receding of the front wheel 2 toward the vehicle-width-direction inner side.

Furthermore, in the vehicle-body structure of the vehicle 1 according to the present embodiment, the inclined portion 552a of the outer body 55 is, in a front view, formed in a shape inclined from the position on the vehicle-width-direction inner side relative to the end on the vehicle-width-direction outer side, and thus, without deteriorating formability of the outer body 55, the deformation strength of the outer body 55 against the pressure load from the vehicle front side can be secured, so that the receding of the front wheel 2 toward the vehicle-width-direction inner side can be prevented.

Specifically, for example, in a case where the inclined portion 552a of the outer body 55 is formed in a shape inclined from the end on the vehicle-width-direction outer side of the outer top face 552, an end on the vehicle rear side and the vehicle-width-direction outer side of the inclined portion 552a is located above a corner on the vehicle upper side and the vehicle-width-direction outer side of the outer body 55. Thus, the end on the vehicle rear side and the vehicle-width-direction outer side of the inclined portion 552a may become a bent point which bends due to the pressure load from the vehicle front side.

In contrast, in the present embodiment, the inclined portion 552a is formed in the shape inclined from the position on the vehicle-width-direction inner side relative to the end on the vehicle-width-direction outer side, and thus the bent point is less likely to be formed. Accordingly, in the vehicle-body structure of the vehicle 1 according to the present embodiment, the deformation strength of the outer body 55 against the pressure load from the vehicle front side can be stably secured.

Furthermore, the vehicle-body structure of the vehicle 1 according to the present embodiment can suppress, in the outer top face 552 of the outer body 55, an increase in shape change from a portion on the vehicle rear side relative to the inclined portion 552a to the inclined portion 552a, and thus reduction of the formability of the outer body 55 can be prevented.

Accordingly, in the vehicle-body structure of the vehicle 1 according to the present embodiment, the inclined portion 552a is formed in the shape inclined from the position on the vehicle-width-direction inner side relative to the end on the vehicle-width-direction outer side, and thus, without deteriorating the formability of the outer body 55, the deformation strength of the outer body 55 against the pressure load from the vehicle front side can be secured. As a result, the receding of the front wheel 2 toward the vehicle-width-direction inner side can be stably prevented.

Furthermore, the vehicle-body structure of the vehicle 1 according to the present embodiment includes the clamshell side door which closes, in a freely openable and closable manner, the doorway S formed on the vehicle upper side of the side sill 5 and through which the occupant enters and exits, and the striker 15 disposed at the side sill 5 and with which the latch provided at the side door engages, and the striker 15 is disposed at the outer top face 552 on the vehicle rear side relative to the inclined portion 552a of the outer body 55. Thus, compared with a case where the striker 15 is provided at the inclined portion 552a of the outer body 55, an upper end position of the striker 15 can be located further on the vehicle lower side.

Thus, reduction of accessibility of the occupant due to the striker 15 can be prevented. Thereby, the deformation strength of the outer body 55 against the pressure load from the vehicle front side can be enhanced by the inclined portion 552a without deteriorating the accessibility of the occupant.

Furthermore, in the vehicle-body structure of the vehicle 1 according to the present embodiment, the side sill 5 includes the inner reinforcement member 57 extending in the vehicle front-rear direction along a corner of the inner body 53, and the upper-side outer reinforcement member 58 extending in the vehicle front-rear direction along a corner of the outer body 55; the inner reinforcement member 57 is disposed so that the front end is located at substantially the same position in the vehicle front-rear direction as the rear end of the inner front end 54; and the upper-side outer reinforcement member 58 is disposed so that the front end is located on the vehicle rear side relative to the front end of the outer body 55. Thus, deformation of a closed cross-section portion formed by the outer body 55 and the inner body 53 is suppressed, and motion of the front wheel 2 in association with the front-end collision can be more effectively controlled.

Specifically, when the front-end collision load acts on the front end of the side sill 5 via the front wheel 2, deformation of the inner body 53 can be suppressed by the inner reinforcement member 57 without inhibiting the deformation of the inner front end 54.

Meanwhile, in the present embodiment, the upper-side outer reinforcement member 58 is disposed so that the front end is located on the vehicle rear side relative to the front end of the outer body 55, and thus, when the front-end collision load acts on the front end of the side sill 5, in addition to the outer front end 56, the vicinity of the front end of the outer body 55 can be deformed.

Thus, the front wheel 2 which further recedes in association with the progress of the front-end collision can more stably deflect toward the vehicle-width-direction outer side.

Accordingly, in the vehicle-body structure of the vehicle 1 according to the present embodiment, by the inner reinforcement member 57 and the upper-side outer reinforcement member 58, the front-end collision load acting on the side sill 5 via the front wheel 2 can be further absorbed, and the receding of the front wheel 2 toward the vehicle-width-direction inner side can be more stably prevented.

Here, although in a correspondence between the configuration of the present invention and the above-described embodiment, a top face of an inner front end of the present invention corresponds to the front-end top face portion 542 of the inner front end 54 of the above-described embodiment, and hereinafter, similarly, a bottom face of the inner front end corresponds to the front-end bottom face portion 543 of the inner front end 54, a top face of an outer body corresponds to the outer top face 552 of the outer body 55, a top face of an inner body corresponds to the inner top face 532 of the inner body 53, the top face of the inner front end corresponds to the front-end top face portion 542 of the inner front end 54, and an outer reinforcement member corresponds to the upper-side outer reinforcement member 58, the present invention is not limited to only the configurations of the above-described embodiment, and many embodiments can be obtained.

For example, although in the above-described embodiment, the side sill 5 is provided in which the inner body 53 of the side sill inner 51 is formed of a super high tension steel plate having a predetermined thickness, in which the inner front end 54 is formed of a mild steel plate having a slightly larger thickness than the inner body 53, in which the outer body 55 of the side sill outer 52 is formed of a super high tension steel plate having a slightly smaller thickness than the inner body 53, and in which the outer front end 56 is formed of a mild steel plate having a slightly smaller thickness than the outer body 55, not limited to this, the inner body 53, the outer body 55, the inner front end 54, and the outer front end 56 may be formed in a shape so that the deformation strength against the pressure load from the vehicle front side decreases stepwise in the order of the inner body 53, the outer body 55, the inner front end 54, and the outer front end 56.

Alternatively, by differentiating the thicknesses by using the same material, or by differentiating the materials by using the same thickness, the deformation strength against the pressure load from the vehicle front side may be configured so as to decrease stepwise in the order of the inner body 53, the outer body 55, the inner front end 54, and the outer front end 56.

REFERENCE SIGNS LIST

1 vehicle
2 front wheel
3 hinge pillar
5 side sill
13 rear door
15 striker
51 side sill inner
52 side sill outer
53 inner body
54 inner front end
55 outer body
56 outer front end
57 inner reinforcement member
58 upper-side outer reinforcement member
532 inner top face
542 front-end top face portion
543 front-end bottom face portion
552 outer top face
552a inclined portion
S doorway

The invention claimed is:

1. A vehicle-body structure of a vehicle, characterized by comprising
a pair of left and right side sills including a side sill outer and a side sill inner, the side sill outer and the side sill inner being joined along a vehicle width direction and forming a closed cross-section extending in a vehicle front-rear direction,
wherein the side sill inner comprises:
an inner body formed so as to have an open cross-section open on a vehicle-width-direction outer side, the open cross-section extending in the vehicle front-rear direction; and
an inner front end connected to a front end of the inner body and facing to each of a pair of left and right front wheels so as to serve as a front end portion of the side sill,
the side sill outer comprises:
an outer body formed so as to have an open cross-section open on a vehicle-width-direction inner side, the open cross-section extending in the vehicle front-rear direction; and
an outer front end connected to a front end of the outer body and facing to each of the pair of left and right front wheels so as to serve as a front end portion of the side sill, and
the inner body of the side sill inner, the outer body of the side sill outer, the inner front end of the side sill inner, and the outer front end of the side sill outer are configured in such a manner that deformation strength against a pressure load from a vehicle front side decreases stepwise in this order.

2. The vehicle-body structure of the vehicle according to claim 1, wherein the inner front end includes a top face and a bottom face, the top face and the bottom face facing to each other in a vehicle up-down direction, and
the top face of the inner front end is formed in a shape having a length in the vehicle front-rear direction shorter than a length of the bottom face of the inner front end in the vehicle front-rear direction.

3. The vehicle-body structure of the vehicle according to claim 1, further comprising a pair of left and right hinge pillars extending in a vehicle up-down direction, each hinge pillar having a lower end connected to a vicinity of a front end of the side sill,
wherein the outer body of the side sill outer and the inner body of the side sill inner are fastened and fixed to the lower ends of the hinge pillars at a plurality of areas.

4. The vehicle-body structure of the vehicle according to claim 1, wherein, in a plan view, a top face of the outer body of the side sill outer is formed in a shape having a front end edge inclined from a vicinity of a boundary between a top face of the inner body of the side sill inner and a top face of the inner front end of the side sill inner toward a vehicle rear side and the vehicle-width-direction outer side.

5. The vehicle-body structure of the vehicle according to claim 4, wherein a top face in a vicinity of the front end of the outer body of the side sill outer includes an inclined portion inclined in such a manner that, in a front view, an end of the inclined portion on the vehicle-width-direction inner side is located on a vehicle upper side with respect to an end of the inclined portion on the vehicle-width-direction outer side.

6. The vehicle-body structure of the vehicle according to claim 5, wherein, in a front view, the inclined portion of the outer body of the side sill outer is formed in a shape inclined from a position on the vehicle-width-direction inner side relative to the end on the vehicle-width-direction outer side.

7. The vehicle-body structure of the vehicle according to claim 5, further comprising:
a clamshell side door configured to close, in a freely openable and closable manner, a doorway which is formed on a vehicle upper side of the side sill and through which an occupant enters and exits; and
a striker which is disposed at the side sill and with which a latch provided at the side door engages,
wherein the striker is disposed, in the outer body of the side sill outer, at a top face on the vehicle rear side relative to the inclined portion.

8. The vehicle-body structure of the vehicle according to claim 1, wherein the side sill comprises:
an inner reinforcement member extending in the vehicle front-rear direction along a corner of the inner body of the side sill inner; and
an outer reinforcement member extending in the vehicle front-rear direction along a corner of the outer body of the side sill outer,
the inner reinforcement member is disposed so as to have a front end located at substantially the same position in the vehicle front-rear direction as a rear end of the inner front end, and
the outer reinforcement member is disposed so as to have a front end located on a vehicle rear side relative to the front end of the outer body.

9. The vehicle-body structure of the vehicle according to claim 6, further comprising:
a clamshell side door configured to close, in a freely openable and closable manner, a doorway which is formed on a vehicle upper side of the side sill and through which an occupant enters and exits; and
a striker which is disposed at the side sill and with which a latch provided at the side door engages,
wherein the striker is disposed, in the outer body of the side sill outer, at a top face on the vehicle rear side relative to the inclined portion.

* * * * *